United States Patent [19]

Chivari

[11] Patent Number: 4,460,345

[45] Date of Patent: Jul. 17, 1984

[54] SHAFT COUPLING

[76] Inventor: Ilie Chivari, Berliner Strasse 1, D-4690 Herne 2, Fed. Rep. of Germany

[21] Appl. No.: 279,964

[22] PCT Filed: Oct. 29, 1980

[86] PCT No.: PCT/DE80/00164

§ 371 Date: Jun. 26, 1981

§ 102(e) Date: Jun. 26, 1981

[87] PCT Pub. No.: WO81/01317

PCT Pub. Date: May 14, 1981

[30] Foreign Application Priority Data

Oct. 31, 1979 [DE] Fed. Rep. of Germany ....... 2943921
Feb. 27, 1980 [DE] Fed. Rep. of Germany ....... 3007268
May 7, 1980 [DE] Fed. Rep. of Germany ....... 3017398

[51] Int. Cl.³ .......................... F16D 3/50; F16D 3/62; F16D 3/78
[52] U.S. Cl. ...................................... 464/69; 464/81; 464/147
[58] Field of Search .................... 464/69, 81, 137, 147

[56] References Cited

U.S. PATENT DOCUMENTS

| | | | |
|---|---|---|---|
| 2,580,781 | 1/1952 | Hoffer | 464/69 |
| 2,864,245 | 12/1958 | Amberg | 464/69 |
| 3,726,108 | 4/1973 | Geislinger | 464/69 X |
| 4,033,144 | 7/1977 | Allen | 464/147 X |
| 4,203,303 | 5/1980 | Miller | 464/69 X |

FOREIGN PATENT DOCUMENTS

| | | | |
|---|---|---|---|
| 584416 | 9/1973 | Fed. Rep. of Germany | 464/69 |
| 2398217 | 2/1979 | France | 464/69 |
| 618862 | 3/1949 | United Kingdom | 464/69 |

Primary Examiner—Stuart S. Levy
Assistant Examiner—Daniel P. Stodola
Attorney, Agent, or Firm—Collard, Roe & Galgano

[57] ABSTRACT

The invention concerns a shaft coupling between a section rotating about an input axis and a section rotating about an output axis which permits an angle of flexure between input axis and output axis, incorporating: a first coupling half which is fastenable to the section rotating about the input axis, a second coupling half fastenable to the section rotating about the output axis and a number of flexible connecting elements which are arranged in a fashion so as to permit transmission of torsional moment between the first coupling half and the second coupling half.

1 Claim, 30 Drawing Figures

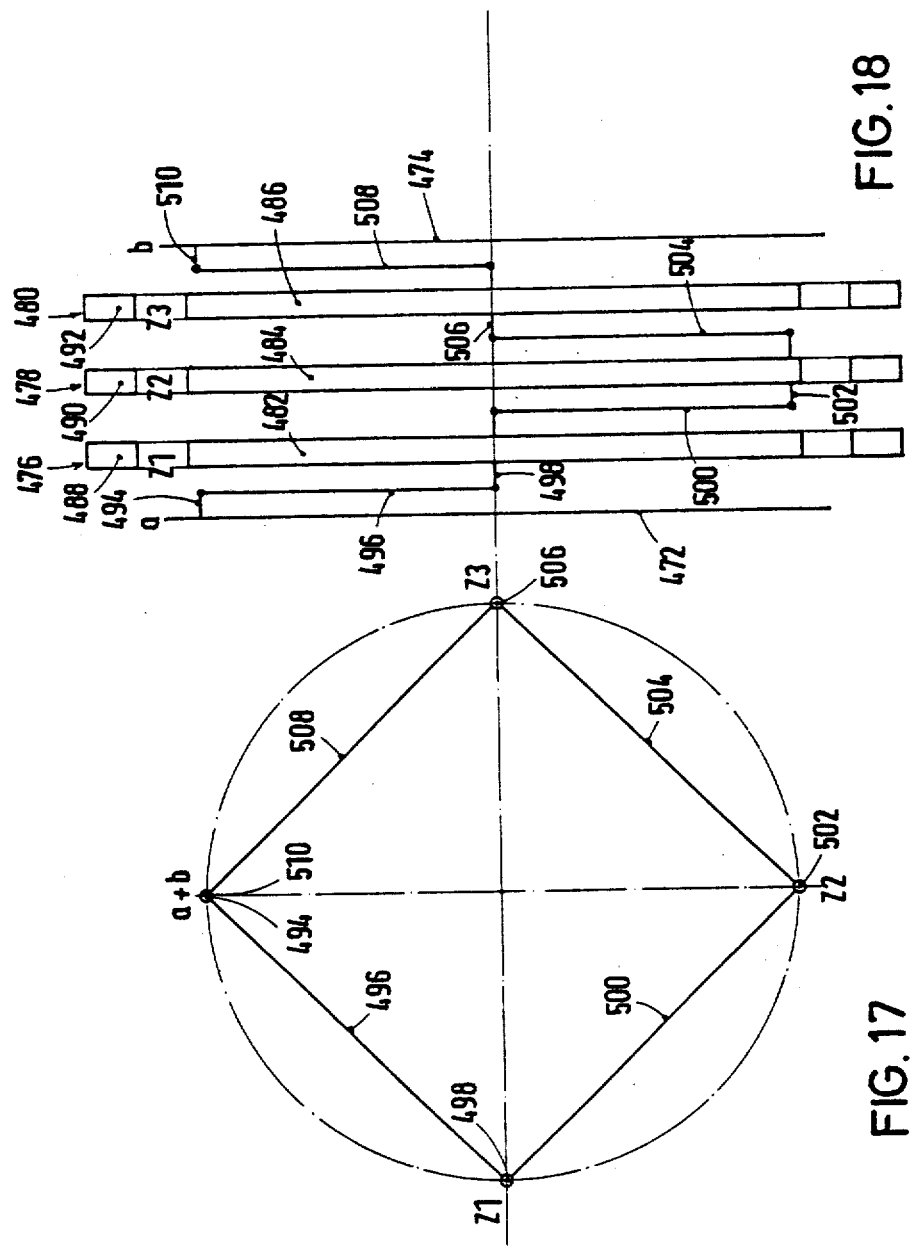

SHAFT COUPLING

STATE OF THE ART ON WHICH THE INVENTION IS BASED

With known shaft couplings of this type the connecting elements consist of straight spring steel plates which are positioned secantly and are fastened directly at one end to the first coupling half and at the other end to the second coupling half. Two pairs of parallel, diametrically opposed spring steel plates are provided so that the spring steel plates are as a whole positioned along the sides of a square. The spring steel plates are fastened to the two coupling halves in such a way that with any direction of rotation one pair in each case is subjected to tension and transmits the torsional moment.

Couplings of this nature permit a small angle of flexure between the input axis and the output axis. This angle of flexure however is very restricted. The spring steel plates are subjected to an alternating load which seriously impairs their service life.

The purpose of the invention is to form a shaft coupling of the type defined above in such a way that with compact design a greater angle of flexure and also if necessary radial offset between input axis and output axis is permitted than is the case with already known couplings and that service life is improved.

DISCLOSURE OF THE INVENTION

This problem is solved by the invention by the fact that:

(a) At least one intermediate element is located between the first and the second coupling half, (b) systems of flexible connecting elements are provided which extend essentially in circumferential direction from the first coupling half to the intermediate element and from the intermediate element to the second coupling half, (c) a number of matching connecting elements are provided in regular arrangement about the input and output axis.

By using an intermediate element of this nature it is possible to increase the effective length of the connecting elements with compact design of the shaft coupling. This also increases the flexibility of the coupling with angular offset between input axis and output axis.

Through the use of a number of connecting elements in regular arrangement the forces acting on the intermediate element are balanced in such a way that the intermediate element is retained in central position.

Other designs of the invention are the subject of the subordinate claims. SHORT DESCRIPTION OF DRAWINGS Design examples of the invention are explained below with reference to the appropriate drawings:

Figure 11:
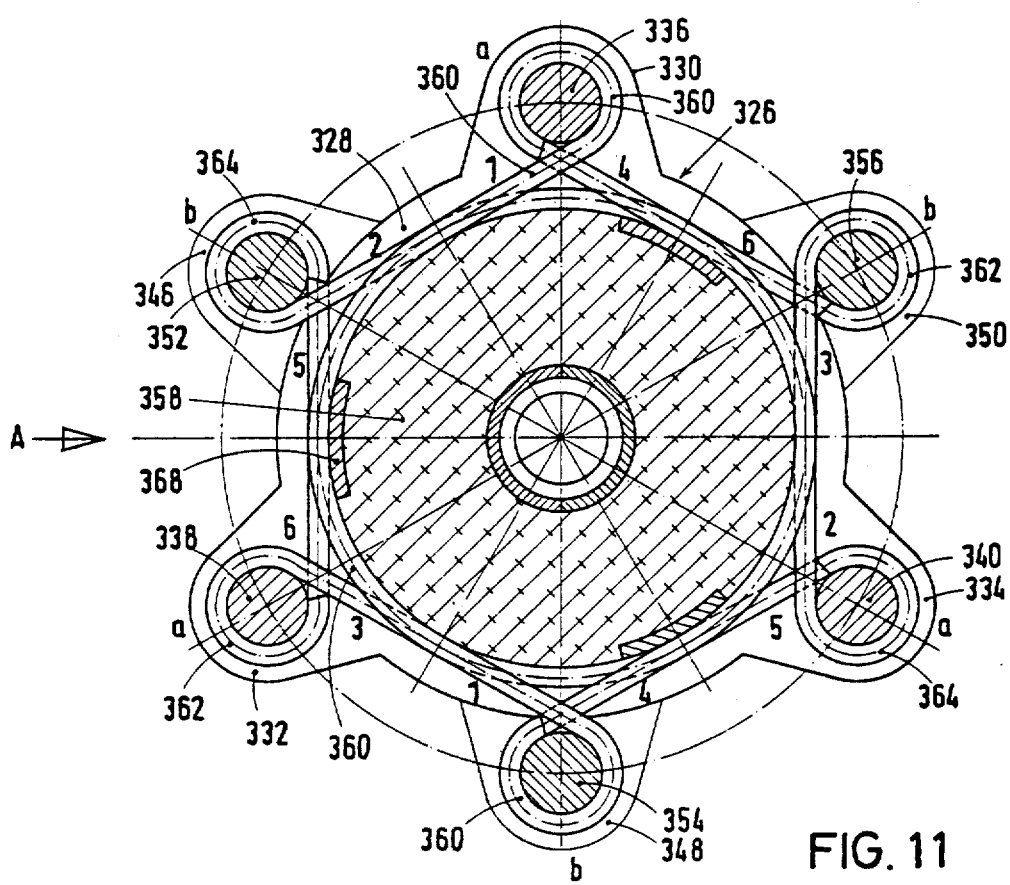
Figure 12:
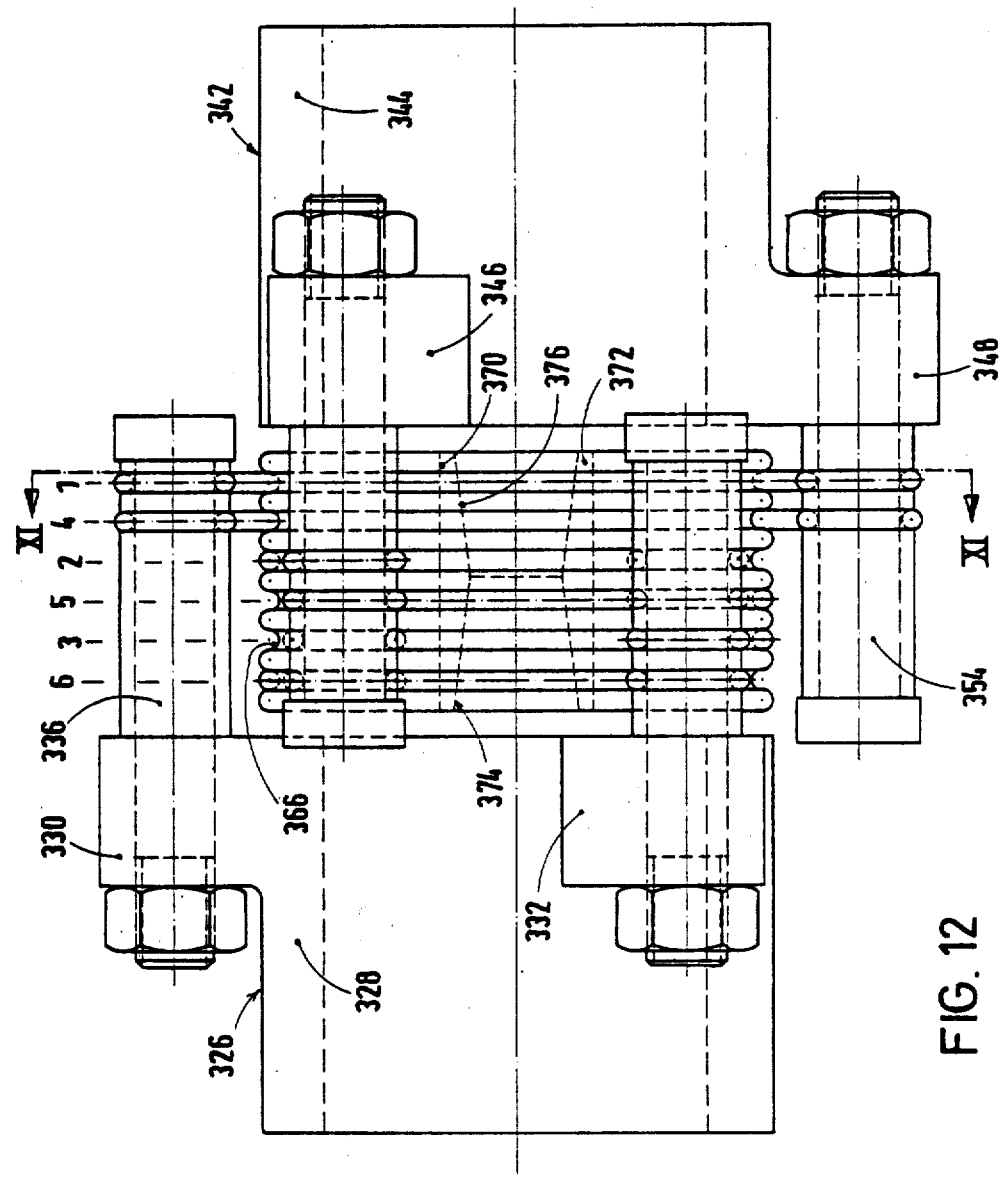
Figure 13:
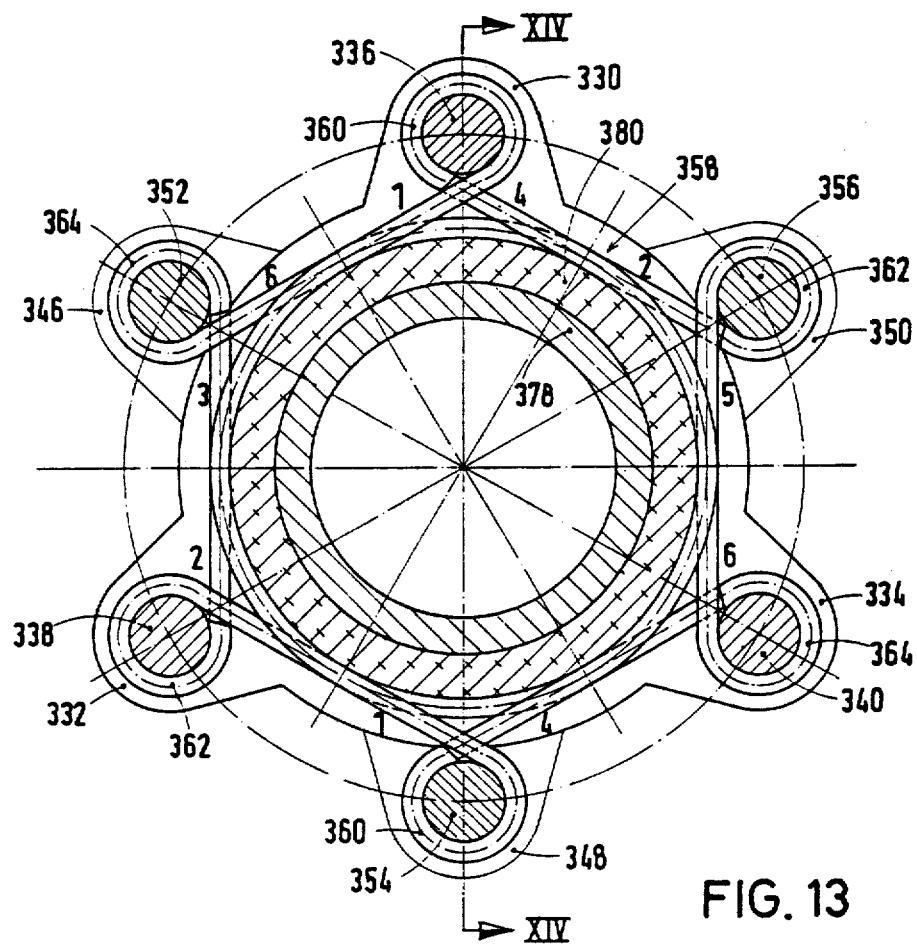
Figure 14:
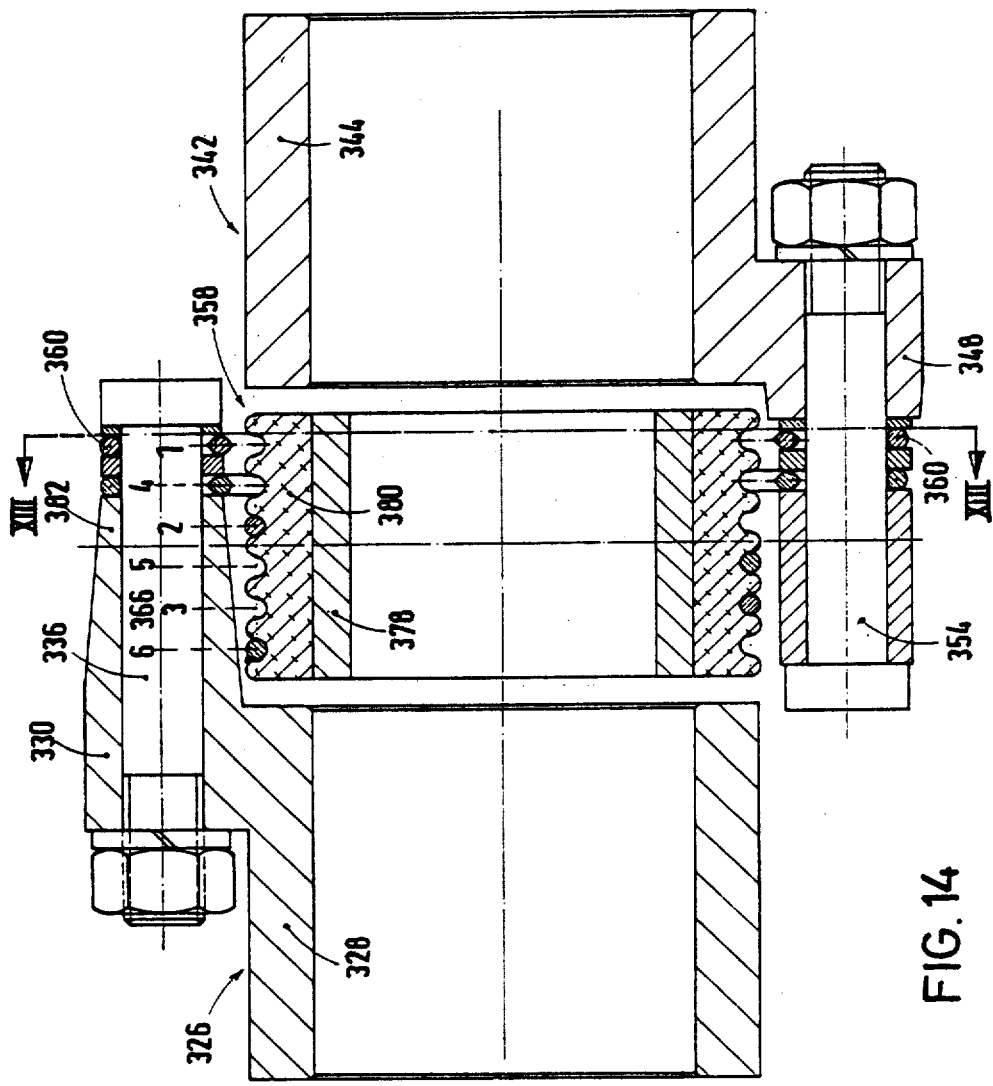
Figure 15:
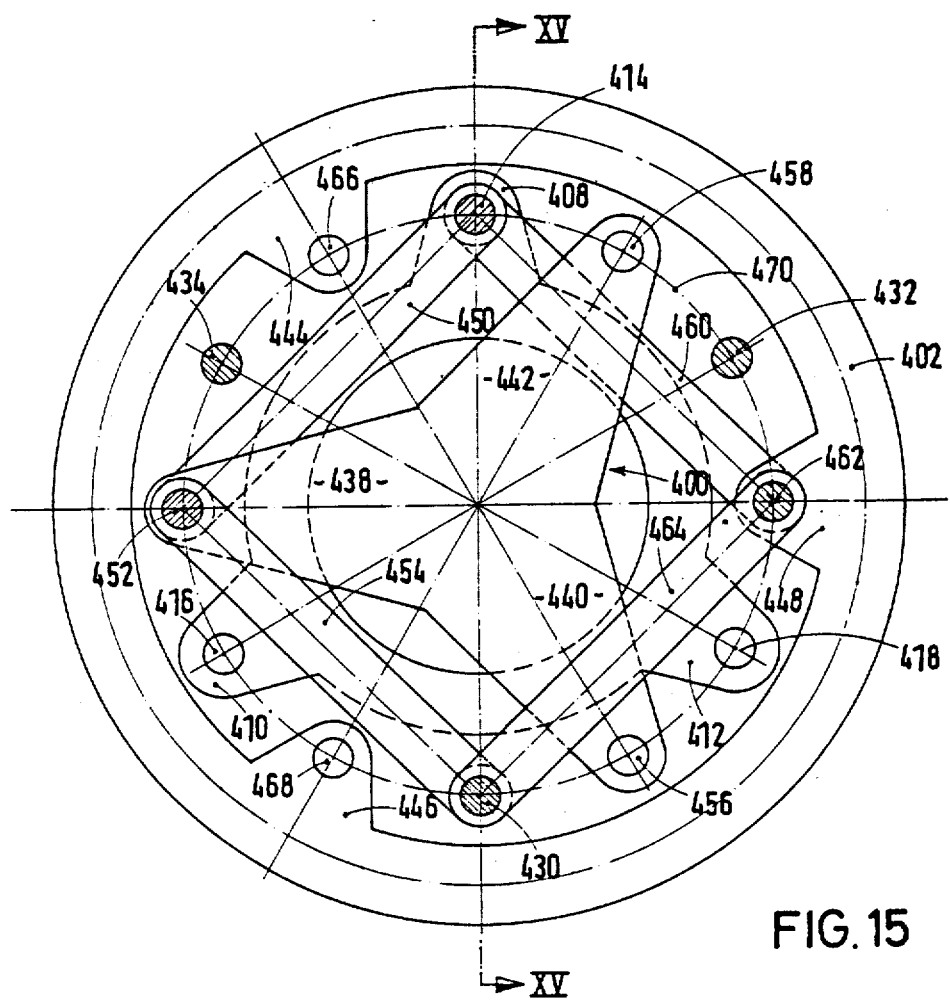
Figure 16:
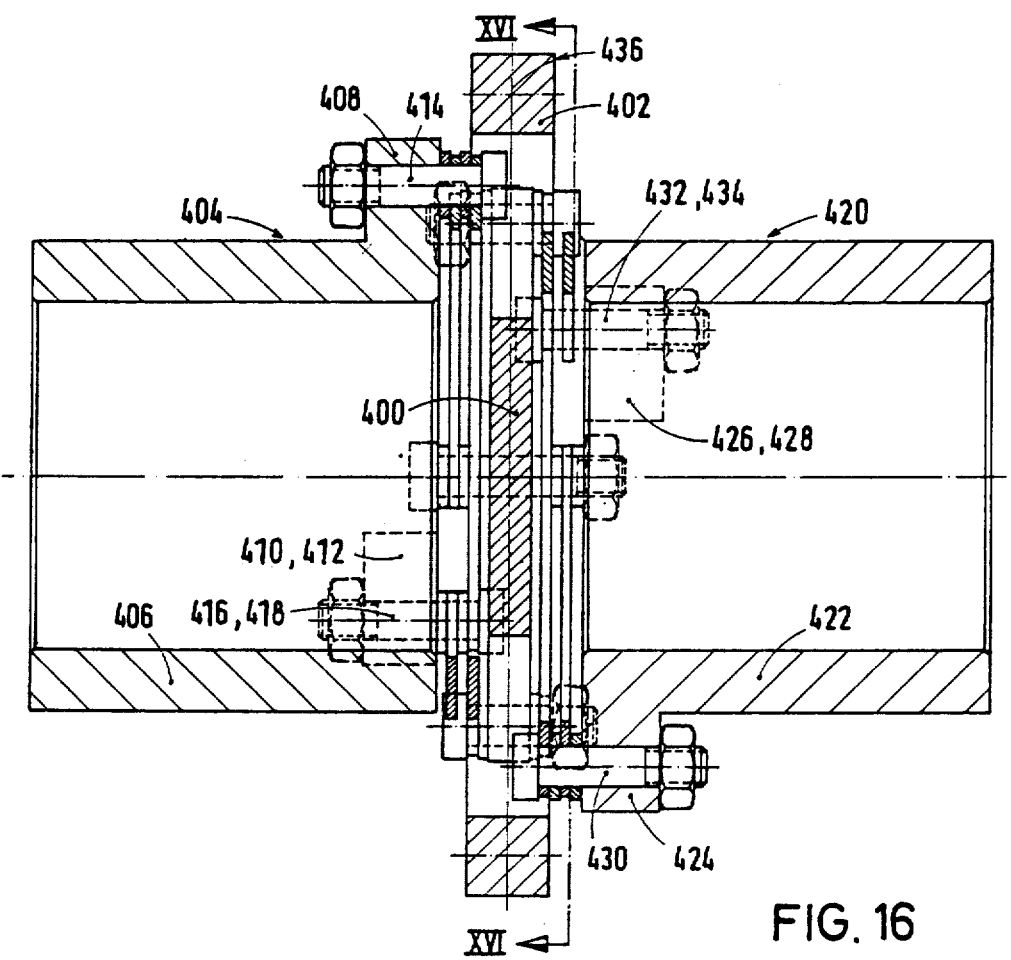
Figure 19:
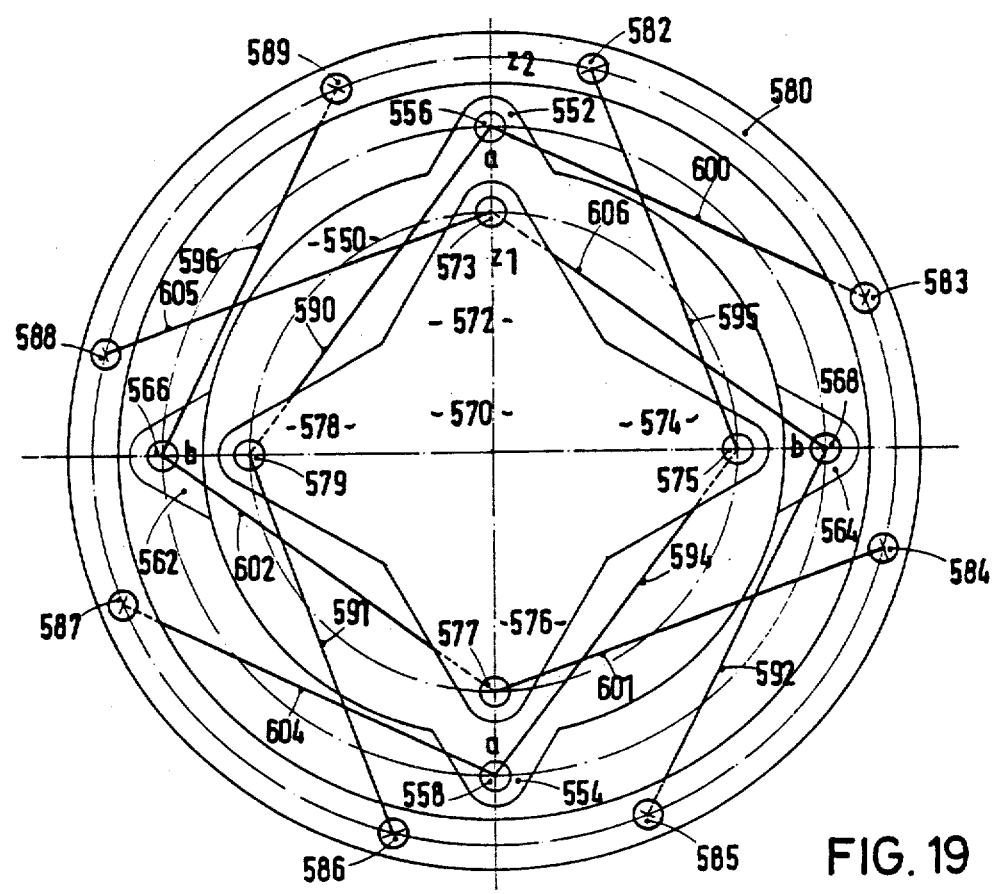
Figure 20:
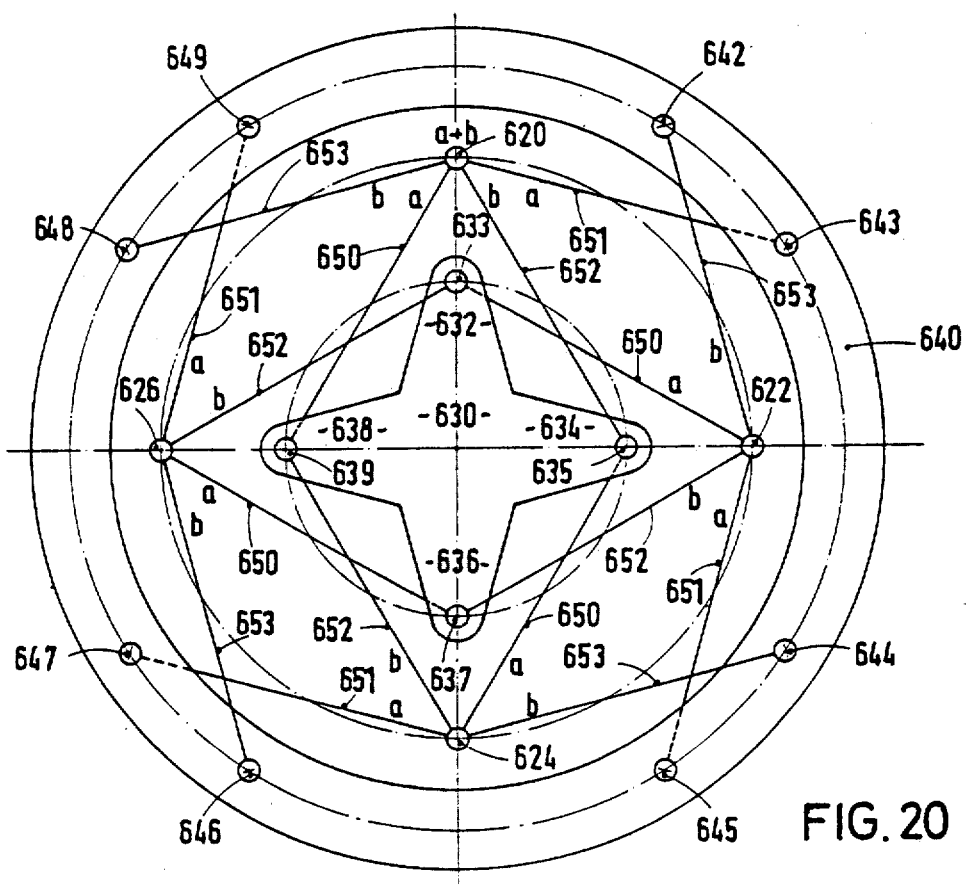
Figure 21:
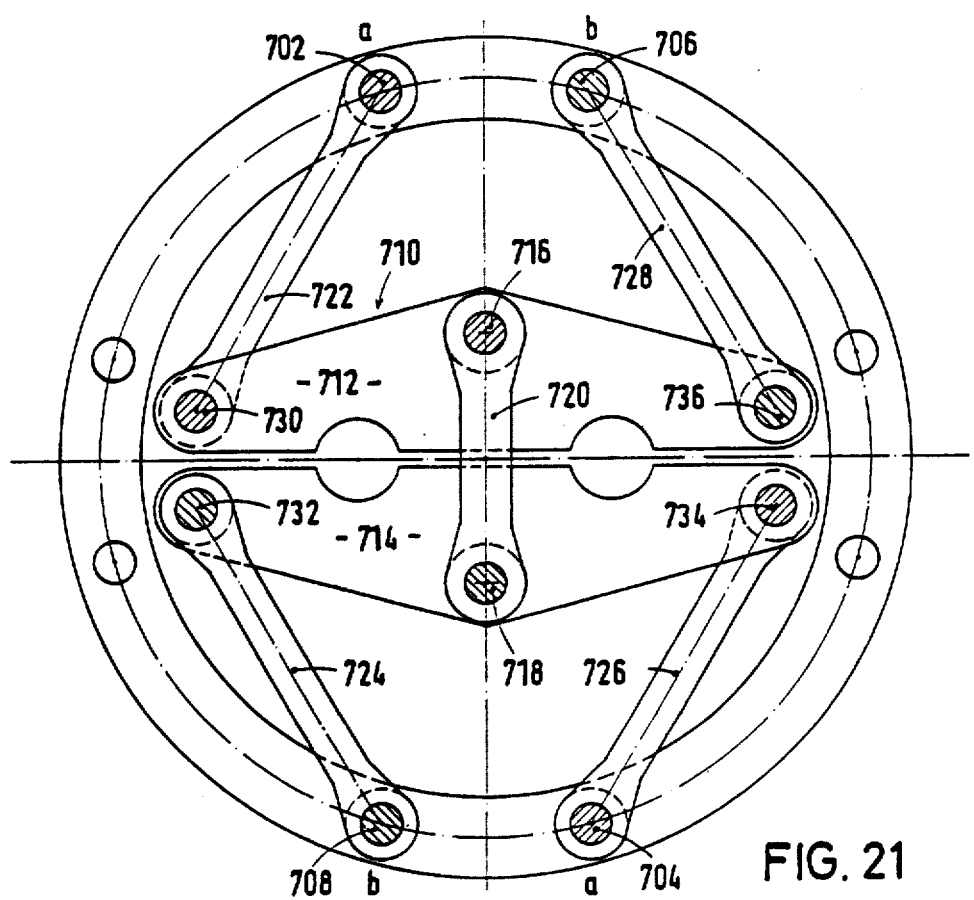
Figure 22:
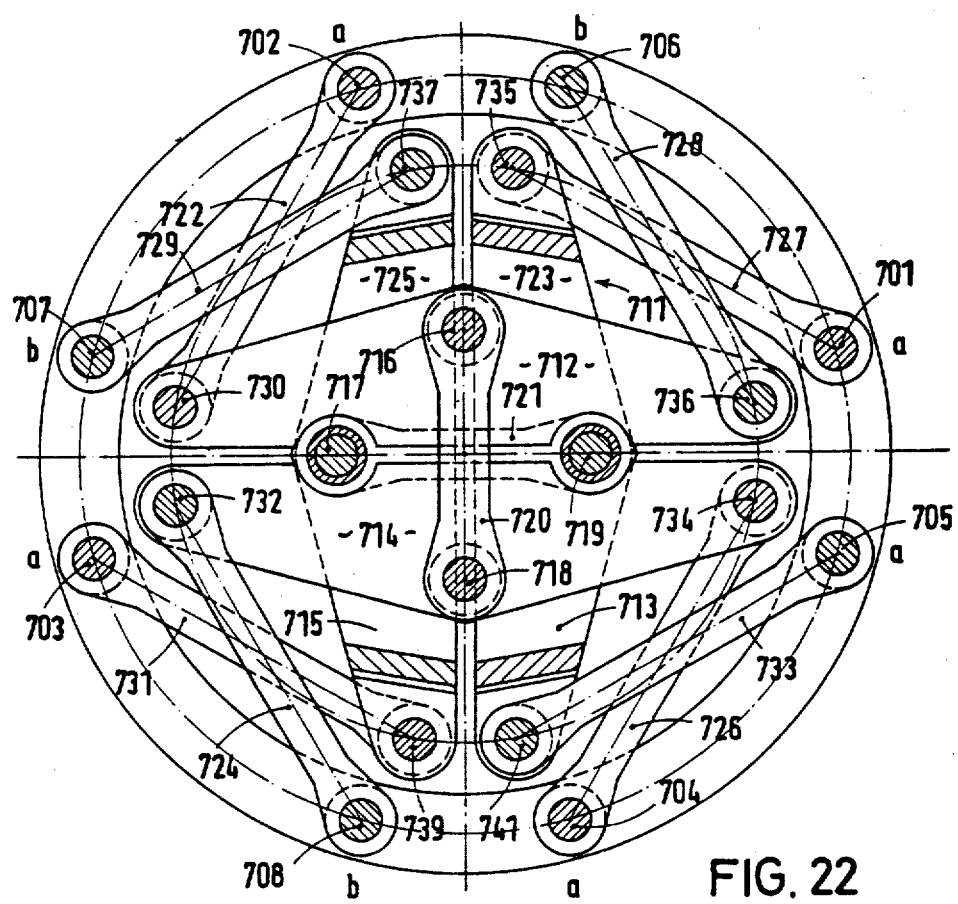
Figure 23:
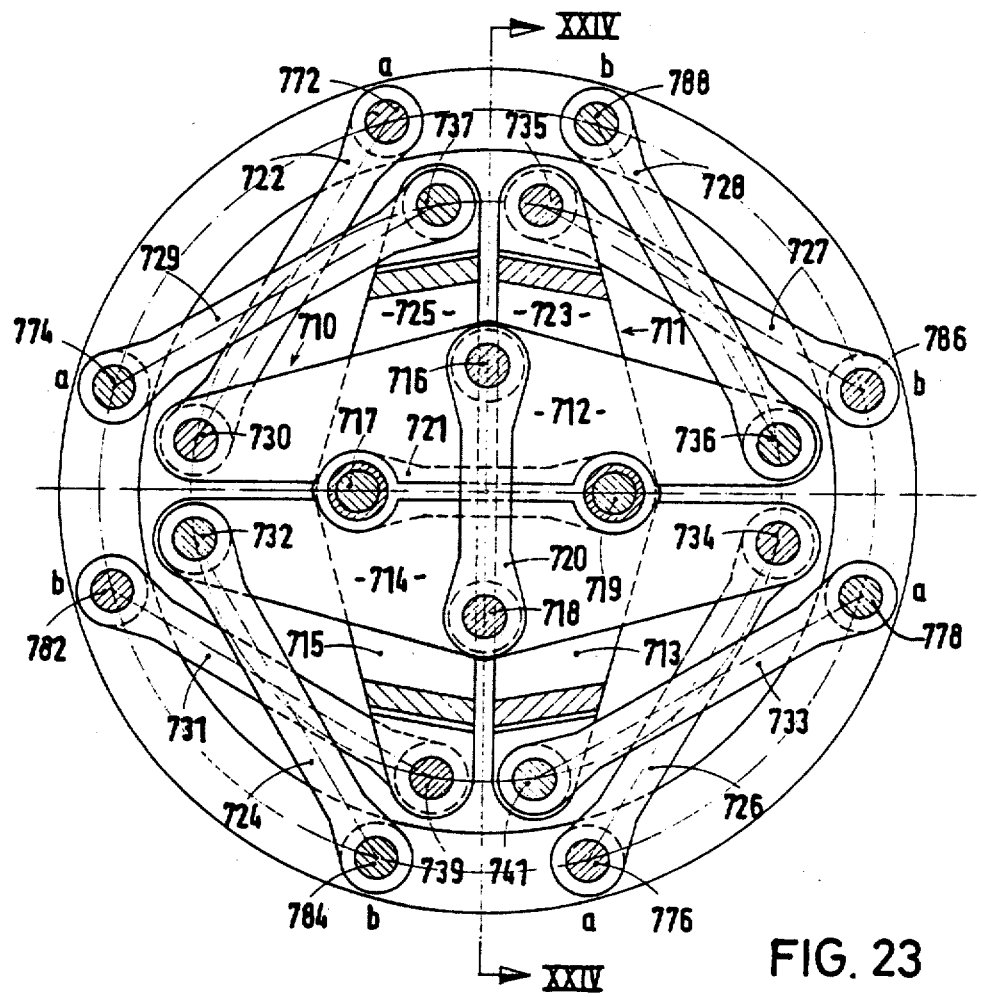
Figure 24:
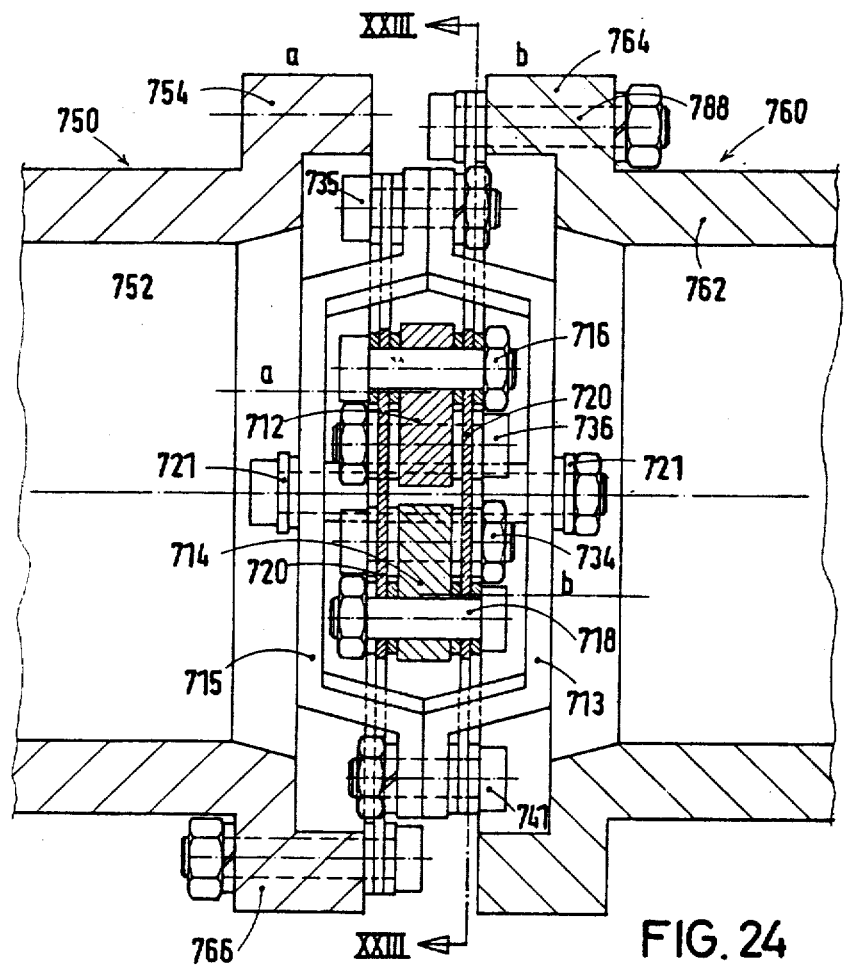

FIG. 11 shows a cross section through a fifth form of design of the shaft coupling according to the invention along line XI—XI in FIG. 12, FIG. 12 shows a view of the shaft coupling in accordance with FIG. 11 from direction A in FIG. 11, FIG. 13 shows a cross section through a modified design of the shaft coupling in accordance with FIG. 11 along line XIII—XIII in FIG. 14, FIG. 14 shows a longitudinal section through the shaft coupling in accordance with FIG. 13 along line XIV—XIV in FIG. 13;

FIG. 15 shows a cross section through a sixth form of design of the shaft coupling according to the invention along line XVI—XVI in FIG. 16, FIG. 16 shows a longitudinal section of the shaft coupling in accordance with FIG. 15 along line XV—XV;

FIG. 17 shows diagrammatically an axial view of a shaft coupling with a number of intermediate elements arranged in tandem which is constructed in accordance with the principle of the form of design of FIGS. 15 and 16, FIG. 18 shows diagrammatically an appropriate side view;

FIG. 19 shows a cross section through a modified design of the shaft coupling in accordance with FIG. 15, FIG. 20 shows a cross section through a further modified design of the shaft coupling in accordance with FIG. 15;

FIG. 21 shows a cross section through a seventh form of design of the shaft coupling according to the invention, FIG. 22 shows a cross section through a modified design of the shaft coupling in accordance with FIG. 21, FIG. 23 shows a cross section through a further modified design of the shaft coupling in accordance with FIG. 21 along line XXIII—XXIII in FIG. 24 and FIG. 24 shows a longitudinal section of the shaft coupling in accordance with FIG. 23 along line XXIV—XXIV in FIG. 23.

Figure 25:
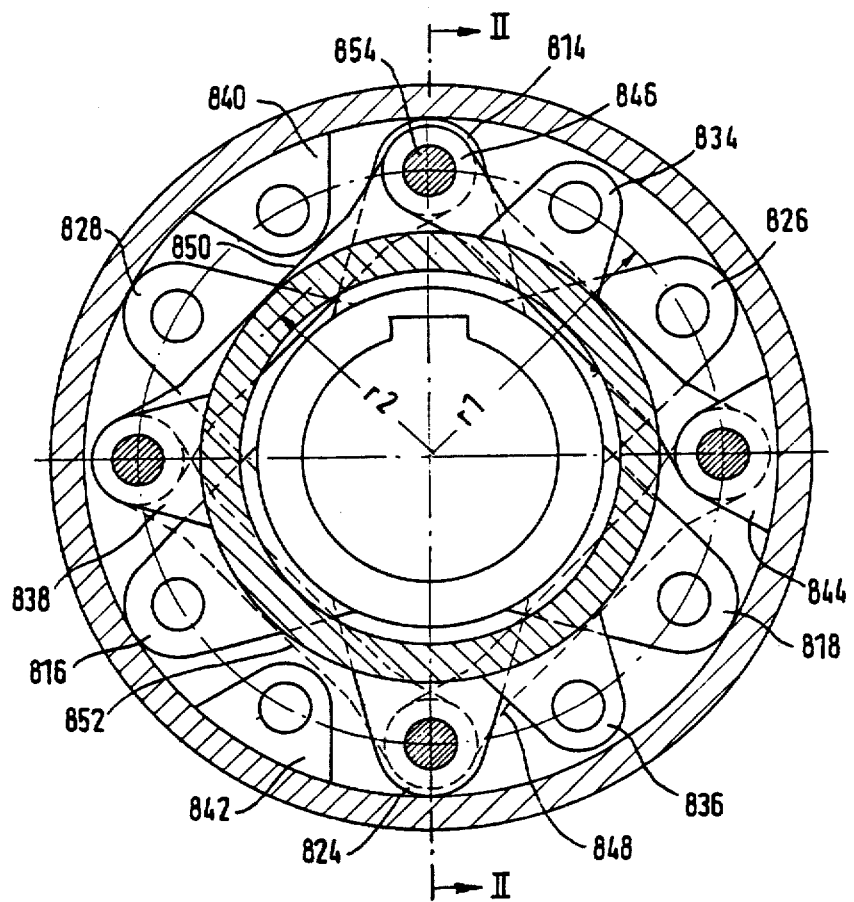
Figure 26:
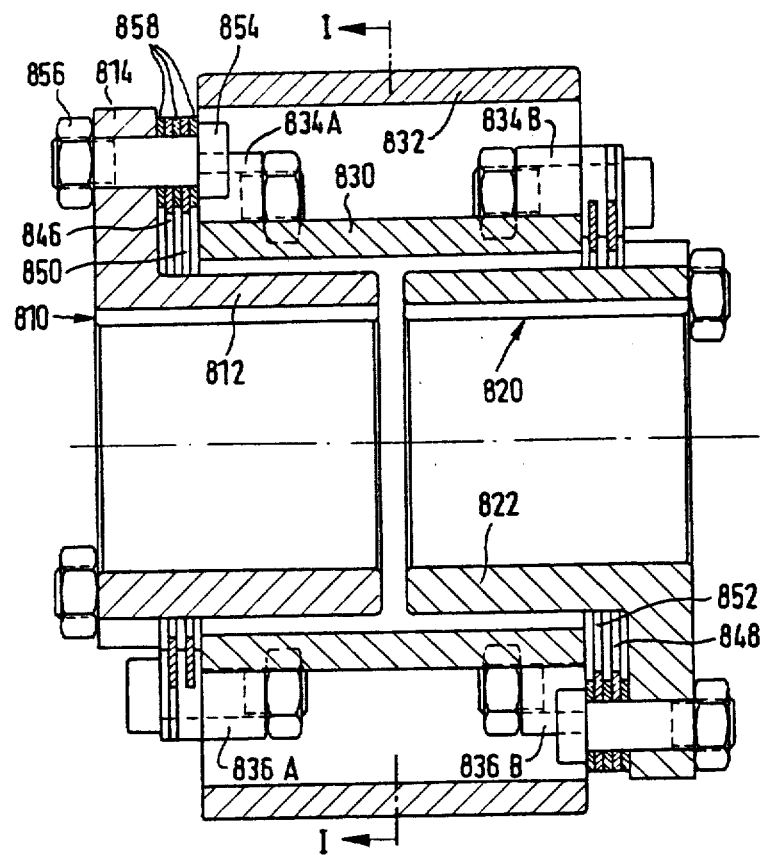

FIG. 25 shows a cross section through a variant of the shaft coupling in accordance with FIGS. 15 and 16 along line I—I in FIG. 26.

FIG. 26 shows a longitudinal section through the shaft coupling in accordance with FIG. 25 along line II—II in FIG. 25.

Figure 27:
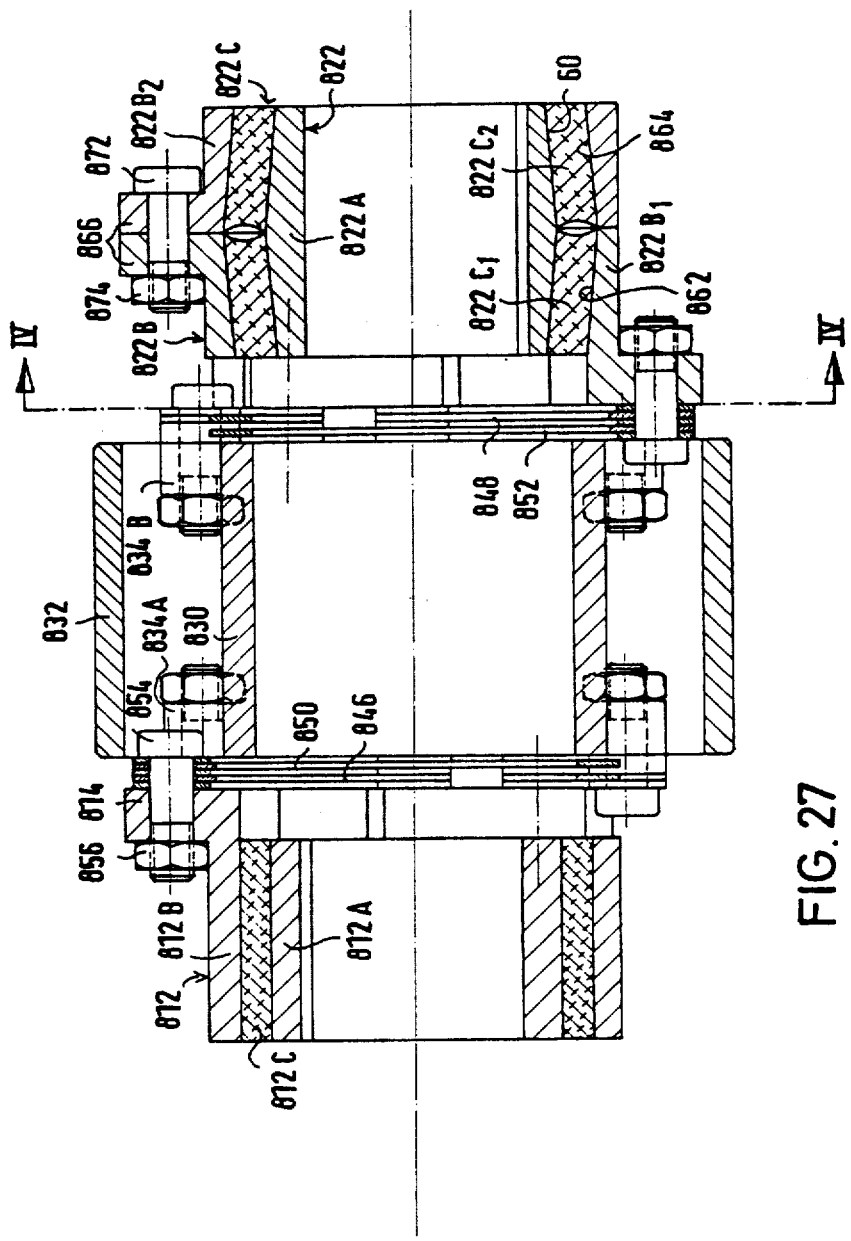
Figure 28:
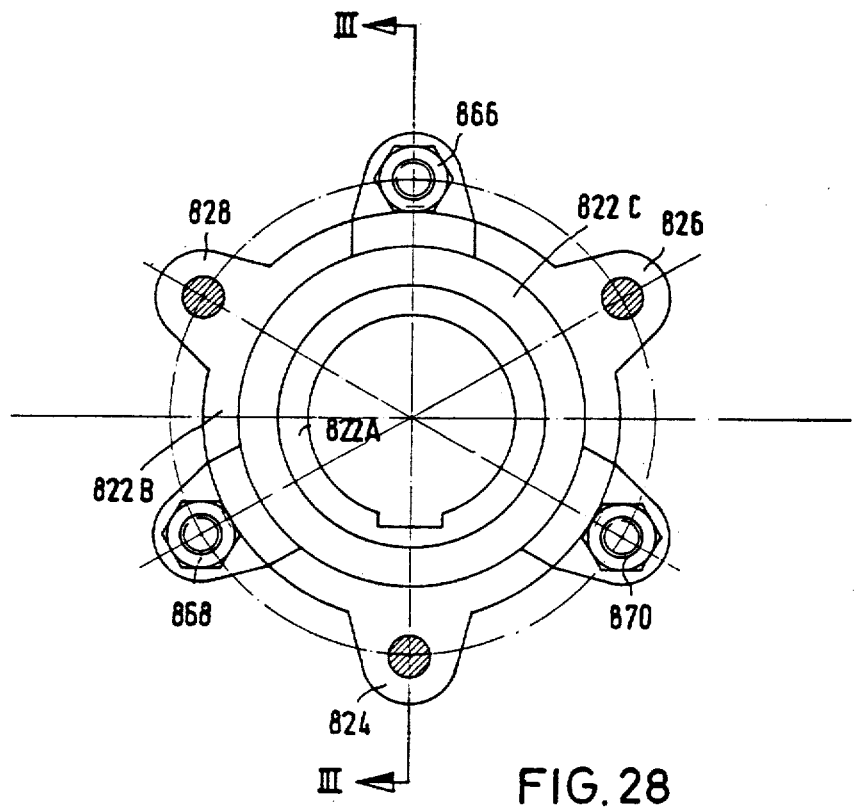

FIG. 27 shows a longitudinal section through another form of design of the shaft coupling in accordance with FIG. 25 along line III—III in FIG. 28.

FIG. 28 shows a cross section along line IV—IV in FIG. 27.

Figure 29:
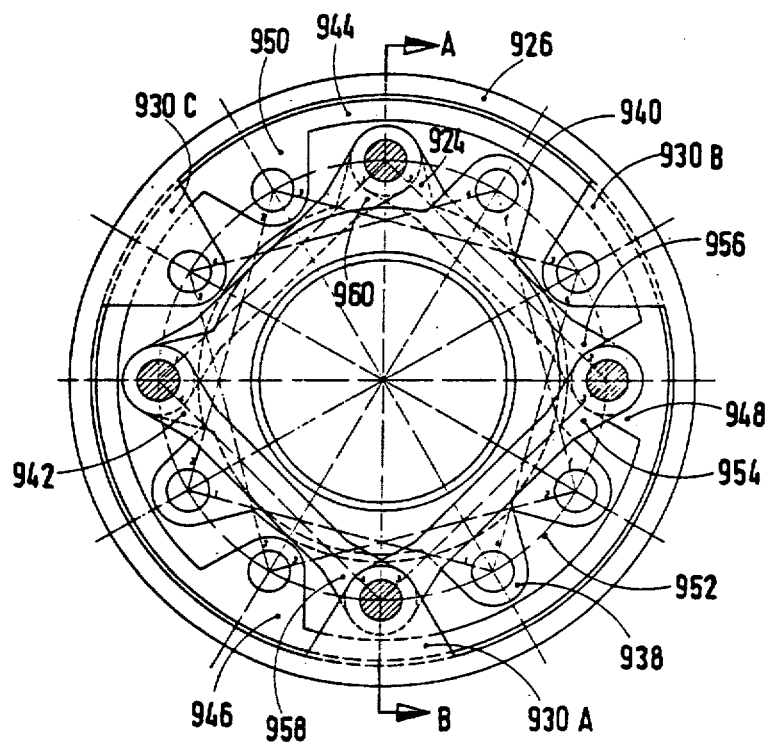
Figure 30:
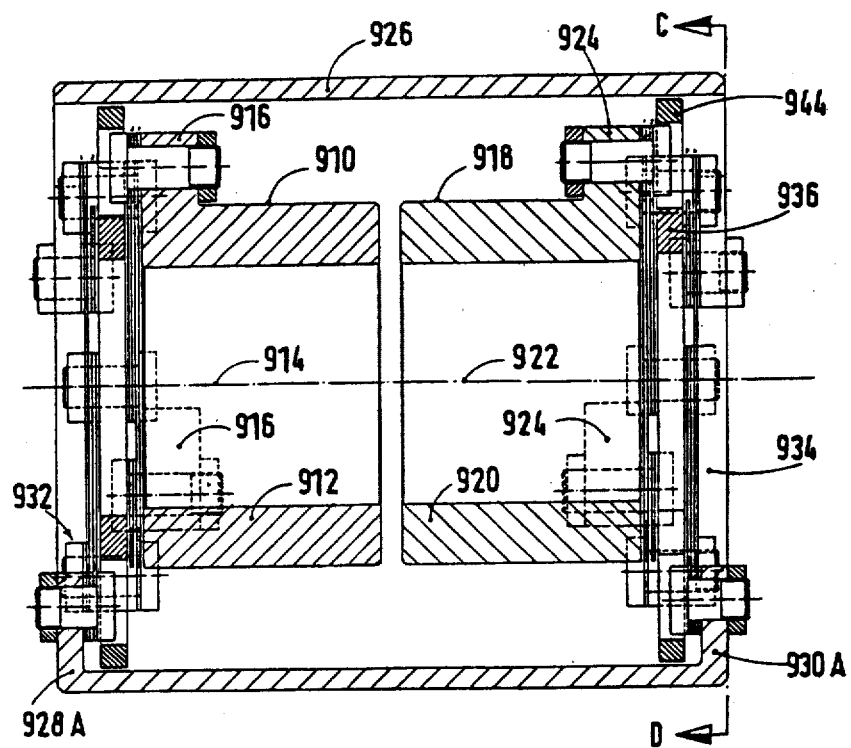

FIG. 29 shows an end view of a further variant of the shaft coupling in accordance with FIGS. 15 and 16 along line C–D in FIG. 30.

FIG. 30 shows a section along line A–B in FIG. 29.

THE BEST WAY OF IMPLEMENTING THE DESIGN OF THE INVENTION

Figure 1:
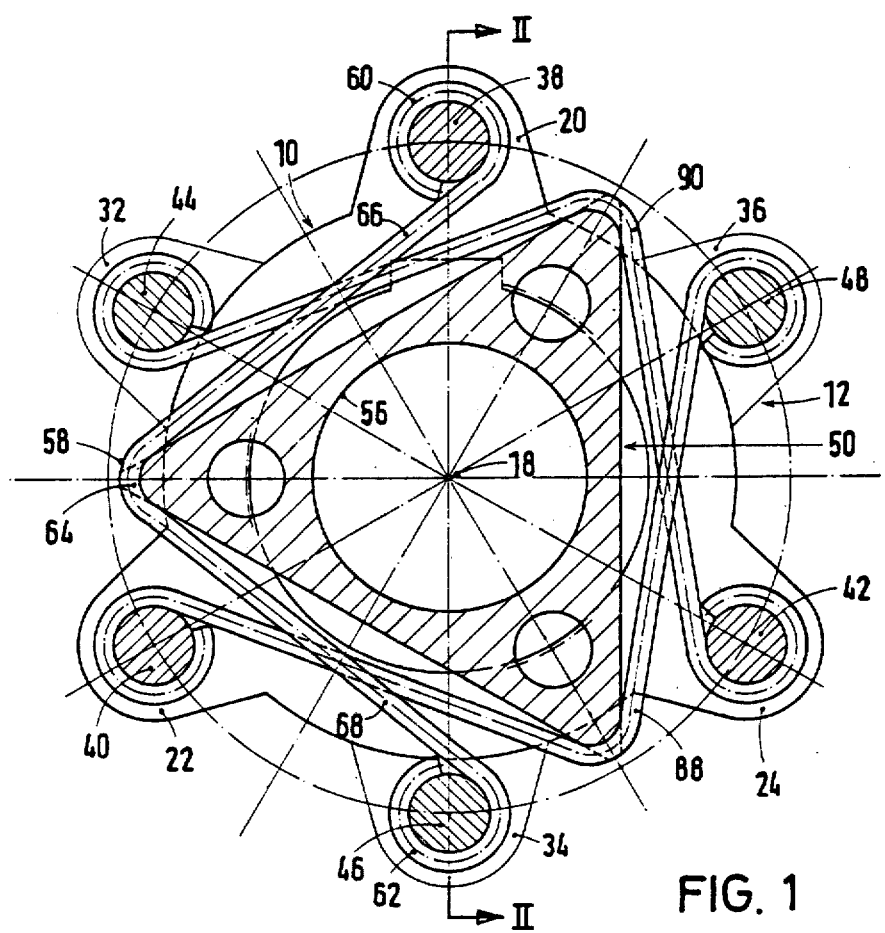
FIG. 1 shows a cross section through an initial form of design of the shaft coupling according to the invention along line I—I in FIG. 2.
Figure 2:
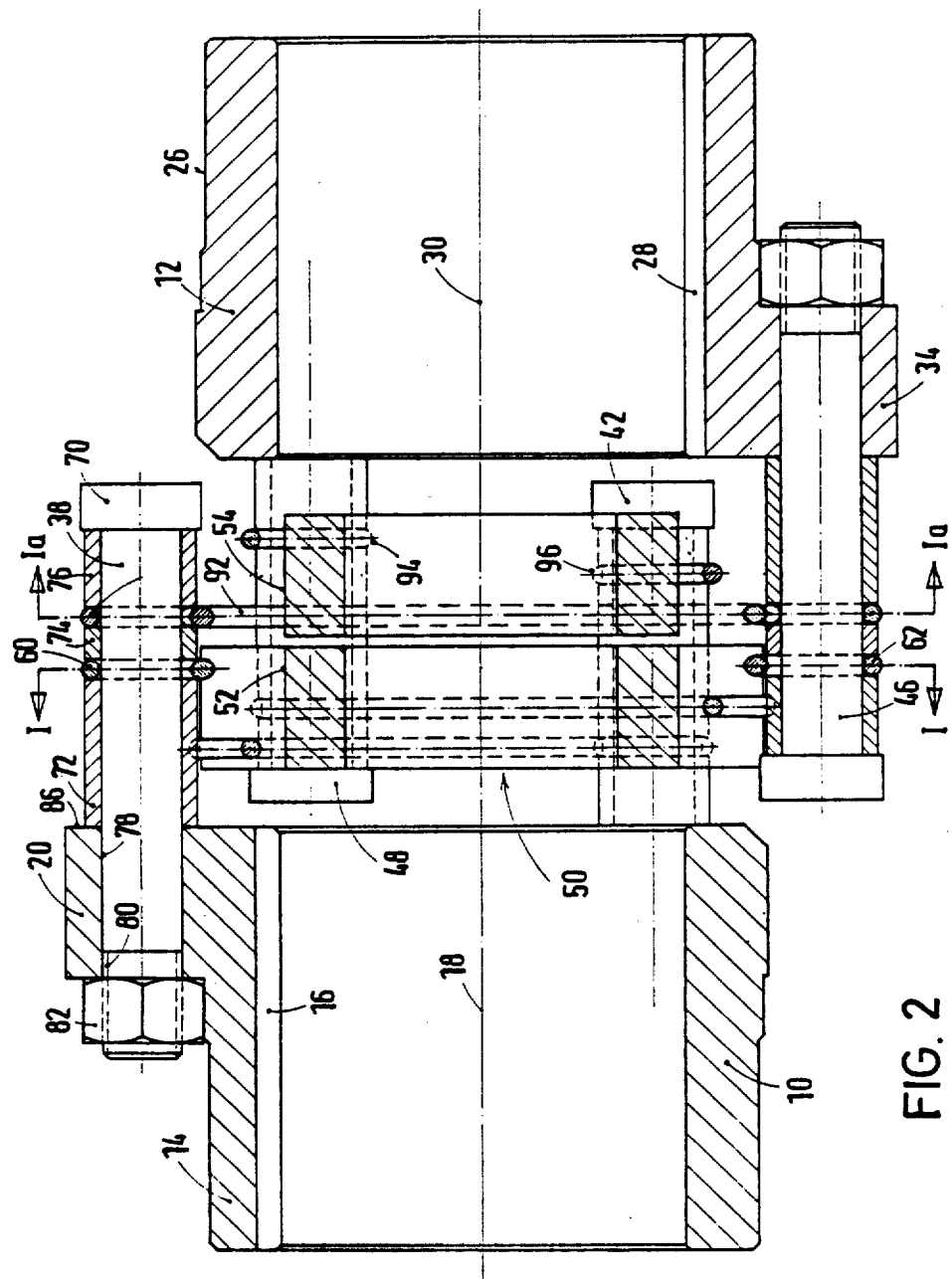
FIG. 2 shows a longitudinal section through the shaft coupling in accordance with FIG. 1 along line II—II in FIG. 1.

In the case of the form of design in accordance with FIGS. 1 and 2 a first coupling half is numbered 10 and a second coupling half numbered 12. The first coupling half 10 consists of a boss 14 which can be non-rotatably connected by means of a keyway 16 to a component rotating about an input axis 18, e.g. a shaft. On boss 14 are located three radial projections 20, 22, 24 at angles of 120° to one another.

The second coupling half 12 also incorporates a boss 26 which can be non-rotatably joined by means of a keyway 28 to a component rotating about an output axis 30, e.g. a shaft as well. Boss 26 has three radial projections 32, 34 and 36 at angles of 120° to one another.

The radial projections 20, 22, and 24 of the first coupling half 10 bear axially projecting pins 38, 40 and 42. On the radial projections 32, 34 and 36 of the second coupling half 12 are provided axially projecting pins 44, 46 and 48 which act in the opposite direction to pins 38, 40 and 42 and engage between them. Between the coupling halves 10 and 12 is positioned an intermediate element 50 which in the case of the design example described consists of two sections 52 and 54. As can be seen from FIG. 1, intermediate element 50 is of triangular basic shape with a central opening 56 to reduce the mass. Pin 38 is joined by a connecting element 58 in the form of a piece of spring steel wire to pin 46. The piece of spring steel wire is V-shaped and at its ends has eyelets 60 and 62 which engage around pins 38 and 47. The V-shaped piece of spring steel wire of connecting element 58 is passed around one edge of triangular cross section intermediate element 50 which is provided for axial location of connecting element 58 with a groove 64. Thus the piece of spring steel wire has a first limb 66 which extends from pin 38 essentially tangentially to the edge of intermediate element 50 and a second limb 68 which runs from this edge to pin 46 of the second coupling half. Pin 46 of the second coupling half is at an angle of 180° to pin 38 of the first coupling half.

The eyelets 60 and 62 are clamped on to pins 38 and 46 and are secured in axial direction. This can best be seen in FIG. 2 and is explained using the example of pin 38 and eyelet 60:

pin 38 has a head 70. Spacer sleeves 72, 74, 76 are pushed on to the shank of pin 38. Eyelet 60 is clamped between spacer sleeves 72 and 74. The end of pin 38 which projects through an axial hole 78 in radial projection 20 is provided with a thread 80. A nut 82 is screwed on to thread 80. By tightening nut 82 the spacer sleeves 72, 74 and 76 are tightened by the head 70 of pin 38, with interposition of eyelet 60 and an eyelet 84 of another connecting element, against the end face 86 of projection 20.

Securing of connecting element 58 on pin 46 and securing of the other connecting elements on the remaining pins is effected in a similar fashion.

As can be seen from FIG. 1, pin 40 of the first coupling half 10 is joined by means of a V-shaped connecting element 88 which rests on the nearest edge of intermediate element 50 to pin 48 of the second coupling half 12 which is diametrically opposed to pin 40. Pin 42 of the first coupling half 10 is joined by means of a V-shaped connecting element 90 which rests on the third edge of intermediate element 50 to pin 44 of the second coupling half 12 which is diametrically opposed to pin 42. The design, support and fastening of connecting elements 88 and 90 is effected in the same way as with connecting element 58. In this way three 120° offset systems of connecting elements 58, 88 and 90 are provided so that the supporting forces acting on section 52 of intermediate element 50 are cancelled out and section 52 of intermediate element 50 is freely retained between connecting elements 58, 88 and 90.

In FIG. 1 the connecting elements 58, 88, 90 extend from the first coupling half 10 in each case counter-clockwise around intermediate element 50 to the second coupling half 12. They transmit the torsional moment when the first coupling half 10 in FIG. 1 is driven clockwise and transmits the rotary motion to the second coupling half 12.

A second set of connecting elements between pins 38, 46 and 40, 48 and 42, 44 extends in the opposite direction of rotation about the second section 54 of intermediate element 50. These three connecting elements are numbered 92, 94 and 96 in FIG. 2. A section along line Ia—Ia provides the same view as FIG. 1 as the direction of view is opposite here.

The arrangement described permits angular offset between input shaft 18 and output shaft 30 with deflection of connecting elements 58, 88, 90 and 92, 94, 96. In contrast to previously known couplings of the type described there is the advantage that with minimum space requirement greater length of the connecting elements is available.

Figure 3:
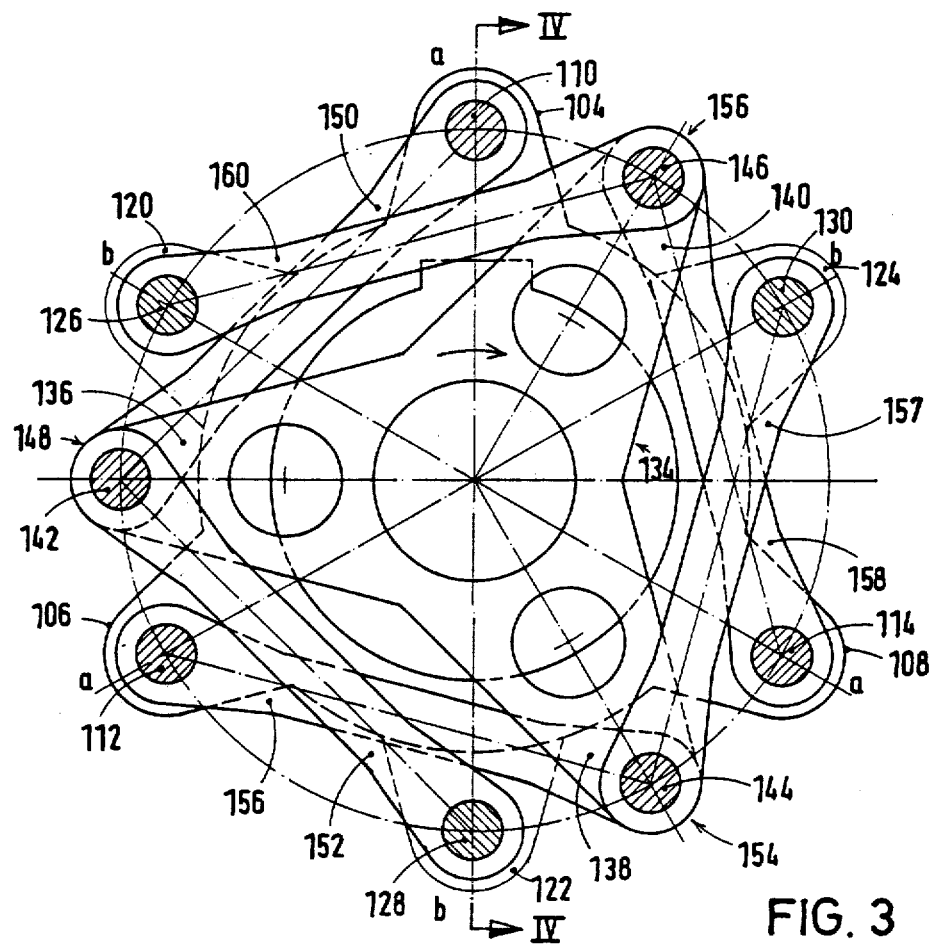
FIG. 3 shows a cross section through a second form of design of the shaft coupling according to the invention along line III—III in FIG. 4.
Figure 4:
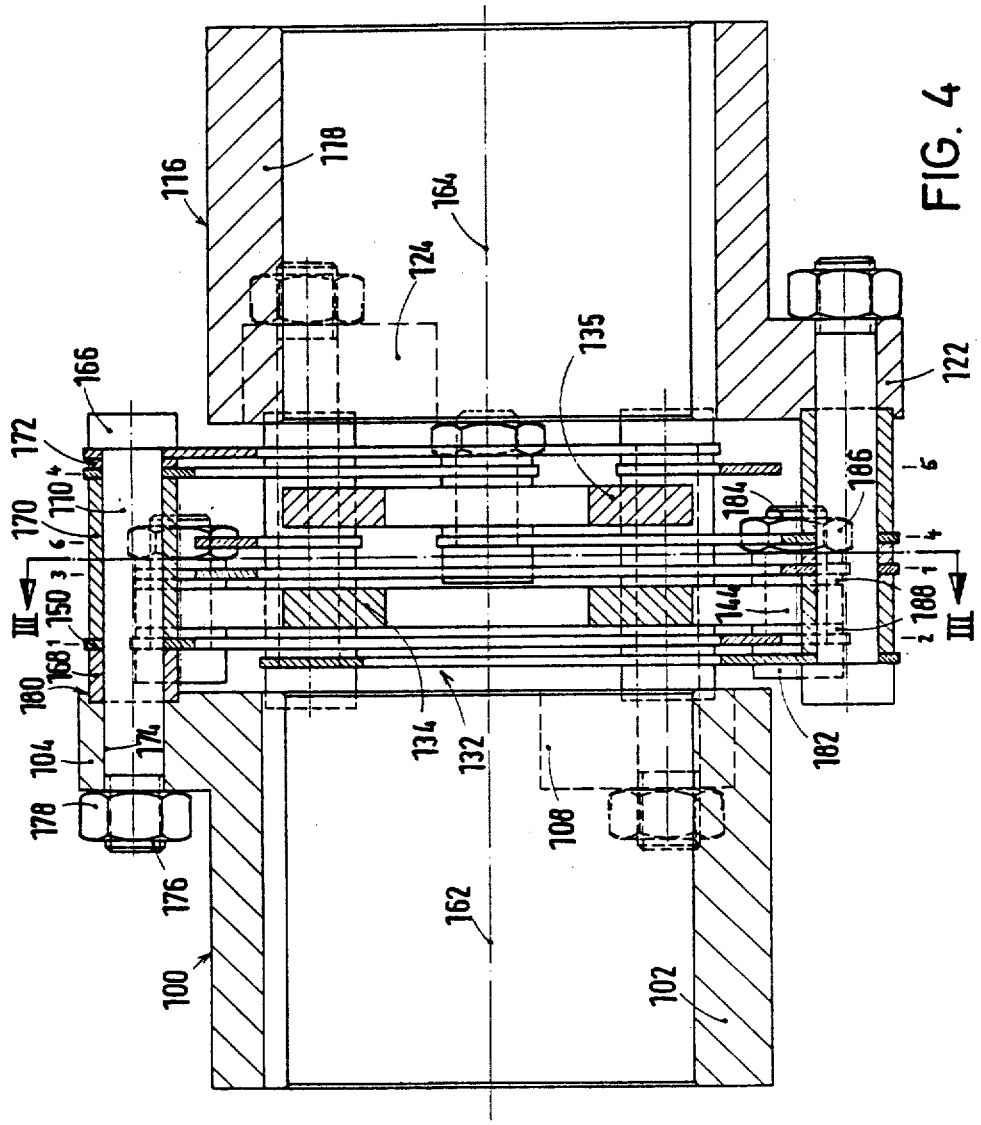
FIG. 4 shows a longitudinal section through the shaft coupling in accordance with FIG. 3 along line IV-IV in FIG. 3.

With the form of design shown in FIGS. 3 and 4, instead the spring steel wire components, elongated spring steel plates are provided as connecting elements.

The first coupling half 100 again has a boss 102 and three radial projections 104, 106 and 108 at an angle of 120° to one another. Each of the projections 104, 106 and 108 has an axial pin 110, 112 and 114. The second coupling half 116 incorporates a boss 118 with three radial projections 120, 122 and 124 at 120° to one another. Each of these radial projections bears an axial pin 126, 128 and 130 whereby pins 126, 128, 130 extend in the opposite direction to pins 110, 112, 114 and engage in each case between the latter. Between the coupling halves 100 and 116 is positioned an intermediate element 132 which also consists of two sections 134 and 135.

Each of the sections 134 and 135 of intermediate element 132 is, as can best be seen from FIG. 3, a star shaped body with three arms 136, 138 and 140 at angles of 120° to one another. Each of the arms bears a pivot pin 142, 144 and 146. A first system 148 of connecting elements consists of a spring steel plate 150 which locates on one side on pin 110 and on the other side on pivot pin 142 and which connects the first coupling half 100 to arm 136 of section 134 of intermediate element 132 and of a second spring steel plate 152 which connects arm 136 of section 134 of intermediate element 132 to pivot pin 128 of projection 122 of the second coupling half 116. A second system of coupling elements 154 consists of a spring steel plate 156 which is attached to pin 112 and pivot pin 144 and connects the first coupling half 100 to section 134 of intermediate element 132 and of a spring steel plate 157 which extends between pivot pin 144 and pin 130 and connects intermediate element 132 to the second coupling half 116. A third system 156 of coupling elements consists of a spring steel plate 158 between pin 114 and pivot pin 146 and of a spring steel plate 160 between pivot pin 146 and pin 126 on the second coupling half 116. The three systems 148, 154 and 156 of connecting elements are each at an angle of 120° to one another. In the normal position shown in which the input axis 162 is in alignment with the output axis 164, projections 120, 122 and 124 on the second coupling half 116 are each offset at an angle of 60° in relation to projections 104, 106 and 108 of the first coupling half 100. The arms 136, 138 and 140 of section 134 locate on the bisectors between projections 120, 106 and 122, 108 and 124, 104. Projection 122 is diametrically opposite to projection 104. Accordingly projection 124 is diametrically opposite projection 106 and projection 120 is diametrically opposite projection 108. The three systems of connection elements 148, 154, 156 shown in FIG. 3 each extend clockwise around intermediate element 132. They are subjected to tension and transmit the torsional moment when the first coupling half 100 rotates clockwise from FIG. 3 and drives the second coupling half 116.

A corresponding set of three connecting elements offset at an angle of 120° to one another is provided between the first coupling half 100, the second section 135 of intermediate element 132 and the second coupling half 116 whereby the systems of connecting elements extend in the opposite direction of rotation about section 135 of intermediate element 132. These connecting elements are subjected to tension when the first coupling half 100 rotates counter-clockwise and drives the second coupling half 116. Fastening of the spring steel plates on the pins will be explained using the example of pin 110 in FIG. 4.

Pin 110 has a head 166. On to the shank of pin 110 are pushed the spring steel plates, e.g. 150, together with the spacer sleeves or collars 168, 170, 172. Here spacer sleeve 168 is retained in a recess in end face 180 of projection 104. Pin 110 extends through a hole 174 in projection 104 and has a thread 176 on to which is screwed a nut 178. When nut 178 is tightened, the spring steel plates 150 etc. and the spacer sleeves 168 etc. are tightened against the end face 180 of projection 104.

In a similar way the pivot pins, e.g. 144, incorporate a head 182 and a thread 184 on the shank of the pivot pin on which is screwed a nut 186. The spring steel plates e.g. 156 and 157, locate on different sides of section 134 of intermediate element 132. When nut 186 is tightened they are clamped against head 182, washers 188 being interposed.

With this arrangement as well the spring steel plates extend essentially tangentially and form a "V" so that with compact construction a considerable effective length of the spring steel plates is obtained and thus as well increased flexibility of the shaft coupling.

Figure 5:
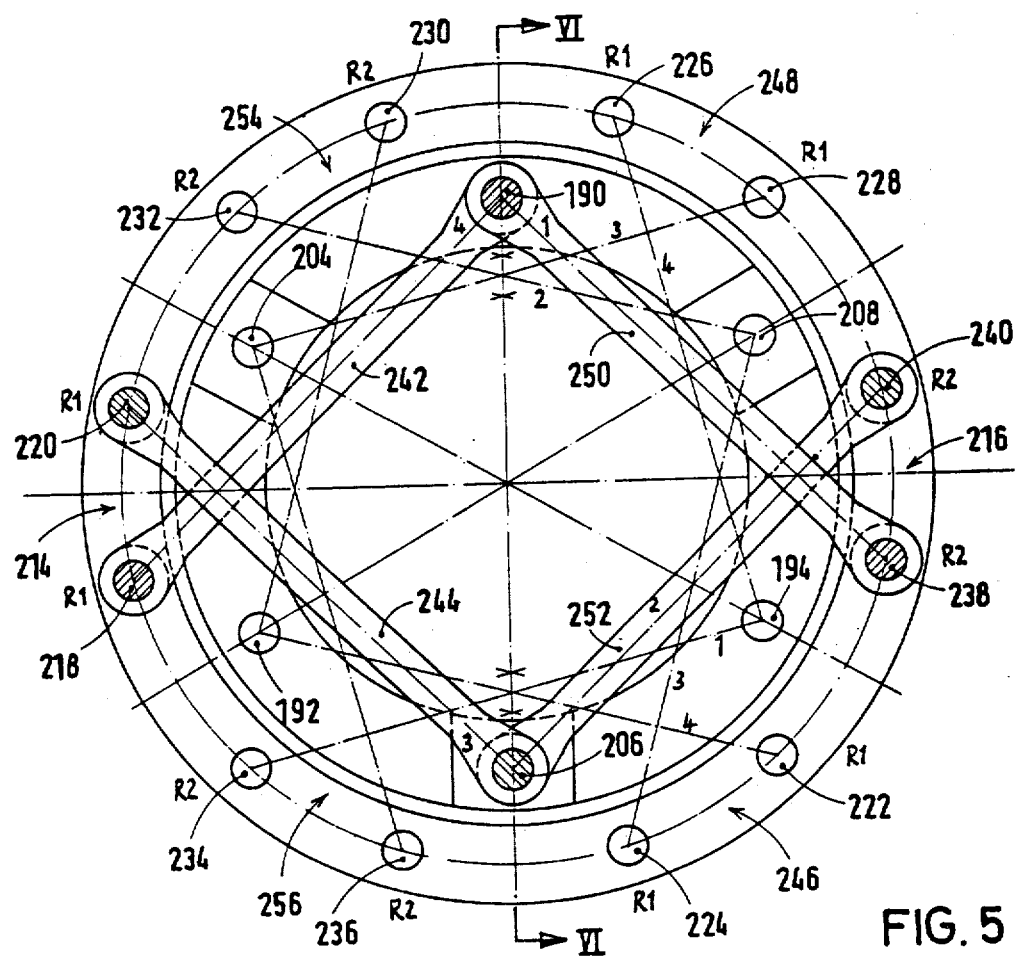
FIG. 5 shows a cross section through a third form of design of the shaft coupling according to the invention along line V—V in FIG. 6.
Figure 6:
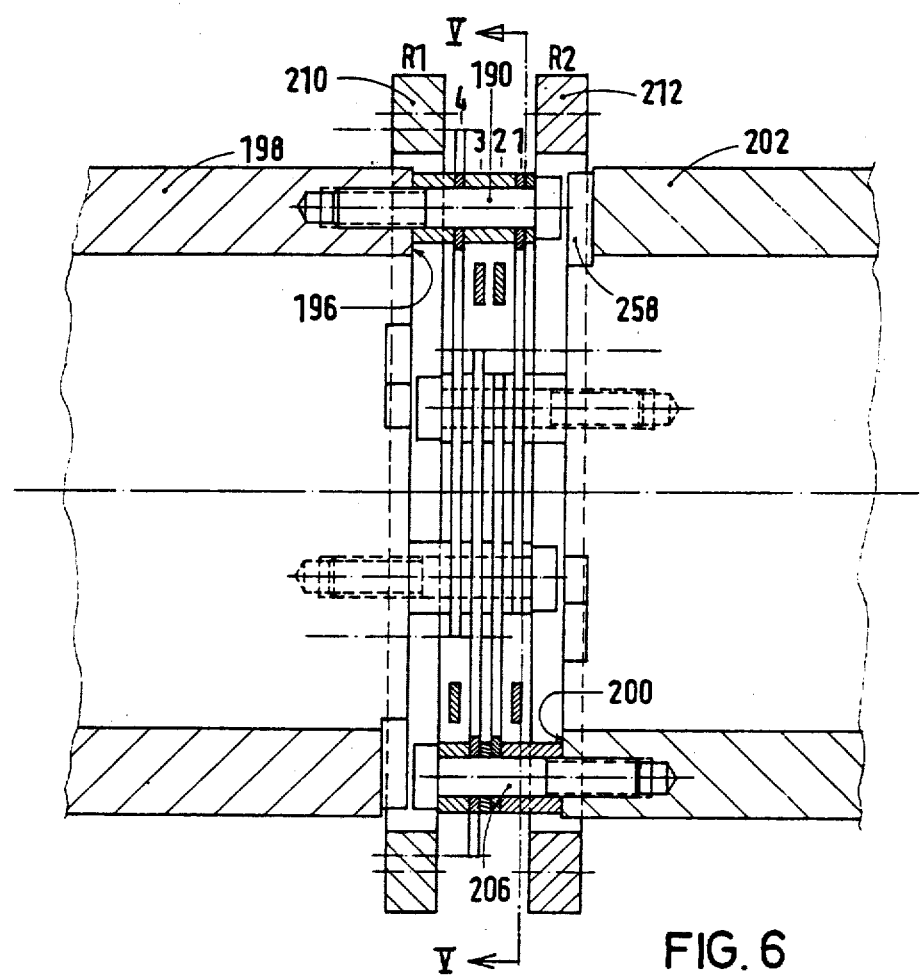
FIG. 6 shows a longitudinal section through the shaft coupling in accordance with FIG. 5 along line VI—VI in FIG. 5.

With the form of design in accordance with FIGS. 5 and 6 pins 190, 192, 194 are provided axially on the end face 196 of a tubular first coupling half 198. On end face 200 of the second coupling half 202 are located pins 204, 206 and 208 which extend in the opposite direction to pins 190, 192, 194 and engage between them.

The intermediate element is formed here by two rings 210, 212 which are concentric with the coupling halves 198 and 202 and are located outside them.

The systems of connecting elements again incorporate straight, elongated spring steel plates each of which extends from the first coupling half 198 to one of the rings 210 or 212 and such spring steel plates which establish connection between ring 210 or 212 and the second coupling half 202. FIG. 5 shows only two such systems 214 and 216, each for one direction of rotation. The remaining systems which are constructed in a corresponding manner and are merely angularly offset have for the sake of clarity only been indicated by broken lines.

Ring 210 incorporates pairs of axial pins 218, 220 and 222, 224 as well as 226, 228. Ring 212 bears pairs of axial pins 230, 232, 234, 236 and 238, 240. Pin 190 of the first coupling half 198 is connected by a spring steel plate 242 to pin 218 of ring 210. Pin 220 of ring 210 is connected by a spring steel plate 244 to pin 206 of the second coupling half 202. In the process spring steel plate 244 crosses spring steel plate 242. Three systems of this type offset angularly in relation to one another by 120° are provided. These systems 214, 246 and 248 are subjected to tension when the first coupling half 198 is driven clockwise and drives the second coupling half 202. For the opposite direction of rotation a second set of three such systems of connecting elements is provided, of which FIG. 5 shows system 216. This system incorporates a spring steel plate 250 which connects pin 190 to pin 238 of the second ring 212 as well as a spring steel plate 252 which connects pin 240 of the second ring 212 to pin 206 of the second coupling half 202. Two further such systems 254, 256 offset by 120° to system 216 are provided between the first coupling half 198, the second ring 212 and the second coupling half 202.

Attachment of the spring steel plates on the pins is effected in a similar manner to that shown in FIG. 4 and is not therefore described again here in detail.

On coupling halves 198 and 202 in the areas in which in each case the other coupling half bears bolt 190 etc., recesses 258 (FIG. 6) are provided to ensure mobility of the coupling halves in relation to one another.

Figure 7:
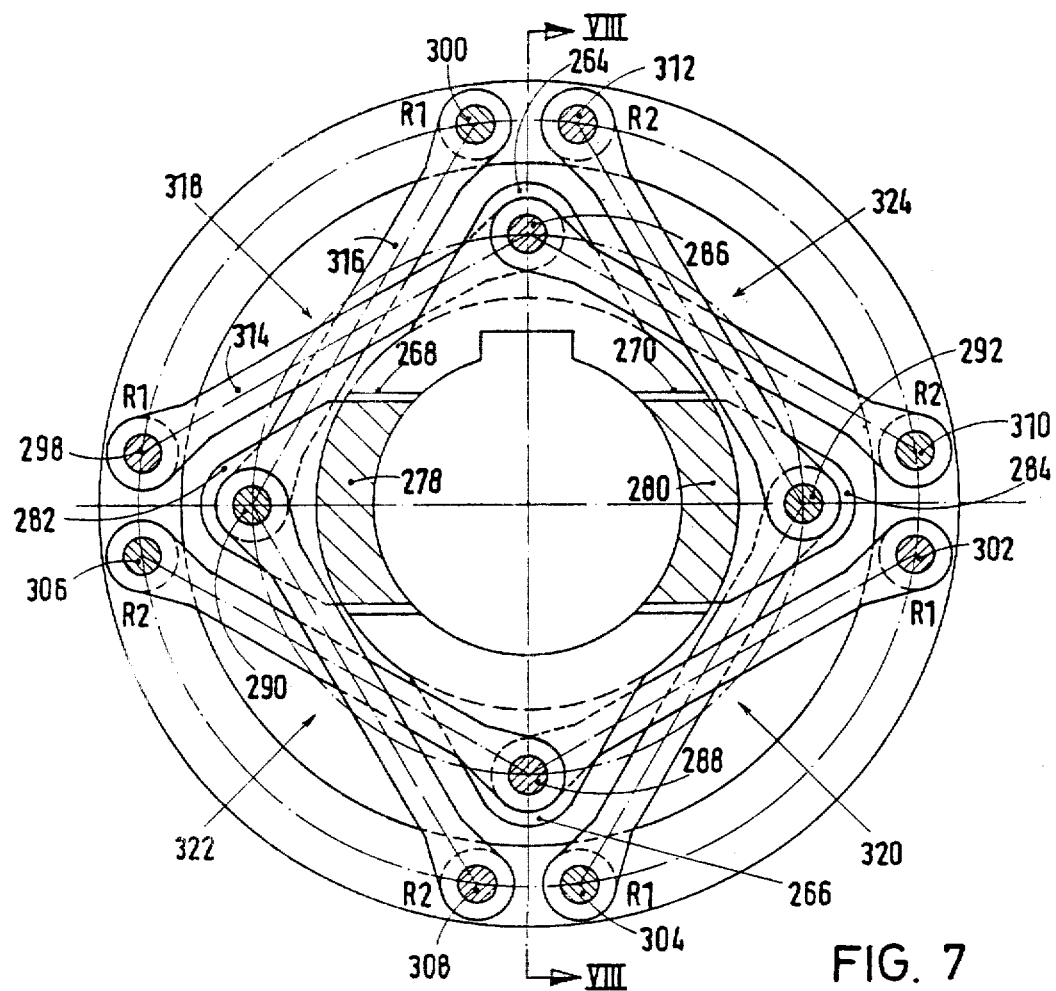
FIG. 7 shows a cross section through a fourth form of design of the shaft coupling according to the invention along line VII—VII in FIG. 8.
Figure 8:
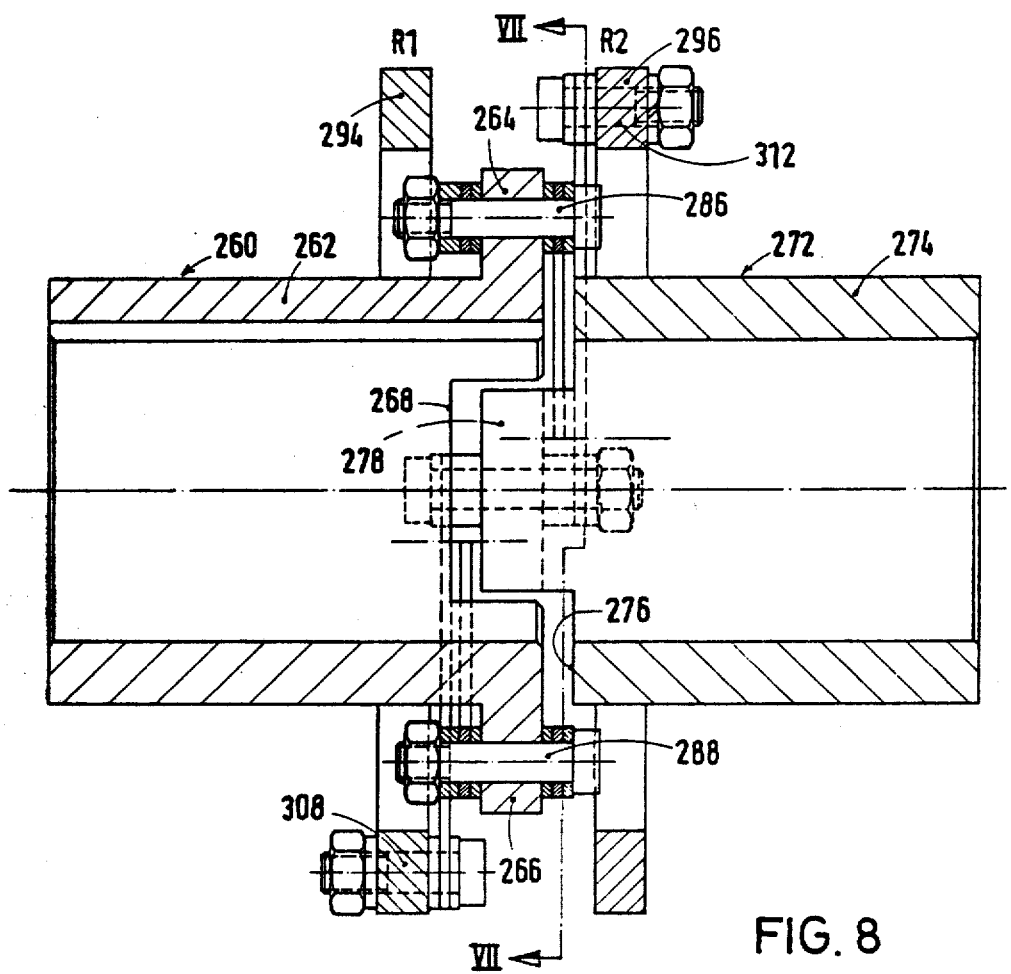
FIG. 8 shows a longitudinal section through the shaft coupling in accordance with FIG. 7 along line VIII—VIII in FIG. 7.

In the case of the form of design as shown in FIGS. 7 and 8 a first coupling half 260 is provided with a boss 262 and a pair of diametrically opposed projections 264 and 266. Offset by 90° to projections 264 and 266 boss 262 is provided, this having a pair of diametrically opposed recesses 268, 270. The second coupling half 272 has a tubular boss section 274 which on its end face 276 facing the first coupling half 260 has two diametrically opposed projections 278, 280 which engage with play in recesses 268, 270. On projections 278, 280 are provided radial lugs 282 and 284 which in this way are located in the same plane as lugs 264 and 266 of the first coupling half 260. In axial holes in the radial lugs 264 and 266 of the first coupling half 260 are located pins 286, 288 which project from the axial holes on both sides of lugs 264, 266. Accordingly, in axial holes in the radial lugs 282 and 284 are located pins 290, 292. Here as well an intermediate element is formed by two rings 294, 296, of which ring 294 is positioned concentrically around the first coupling half 260 whilst the second ring 296 concentrically surrounds the second coupling half 274.

On the first ring 294 in the case of the design illustrated a first pair of pins 298, 300 is located with angular offset of slightly less than 90°. Instead of this the angular offset can also be exactly 90°. Diametrically opposed thereto is positioned a second pair of pins 302, 304. Corresponding pairs of pins 306, 308 and 310, 312 are provided on the second ring 296 offset by 90° thereto.

Between pin 286 on the first coupling half 260 and pin 298 on the first ring 294 extends a spring steel plate 314. A second spring steel plate which crosses spring steel plate 314 extends from pin 300 of the first ring 294 to pin 290 which is provided on the second coupling half 272. The two spring steel plates 314 and 316 form a system 318 in which the spring steel plates 314, 316 are subjected to tension when the first coupling half 260 rotates clockwise and drives the second coupling half 272 accordingly. System 320 diametrically opposed thereto functions in the same way. Corresponding systems 322 and 324 are provided between the first coupling half 260, the second ring 296 and the second coupling half 272 which are subjected to tension when the first coupling half 260 is driven counter-clockwise and drives the second coupling half.

Figure 9:
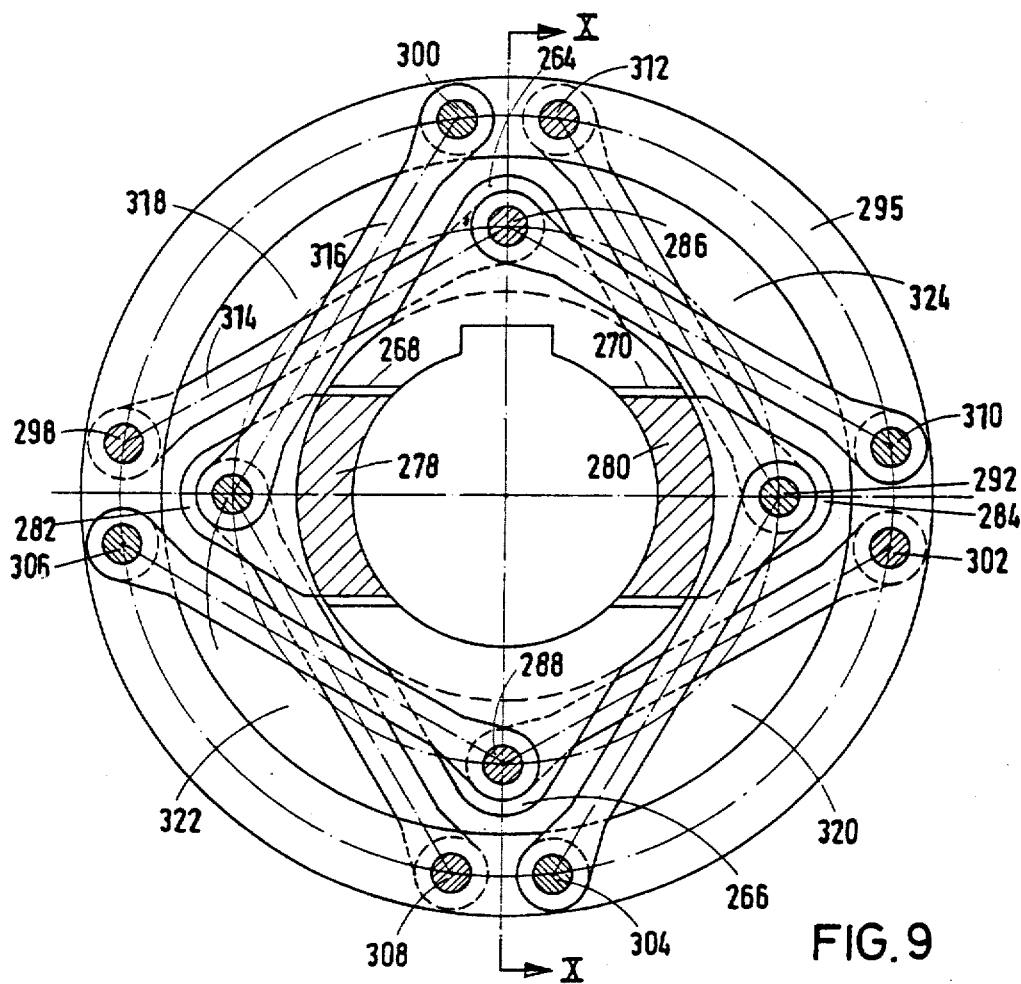
FIG. 9 shows a cross section of a modified design of the shaft coupling in accordance with FIG. 7.
Figure 10:
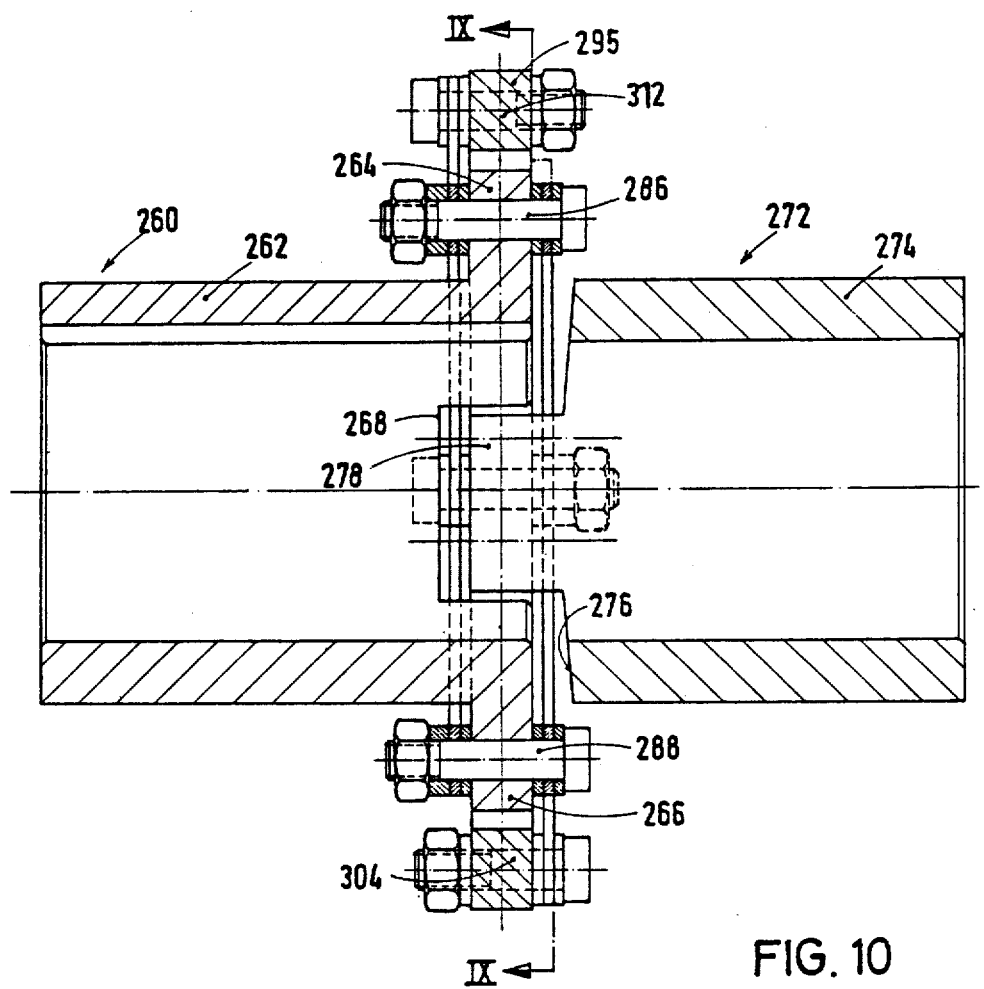
FIG. 10 shows a longitudinal section of the modified design of shaft coupling in accordance with FIG. 9 corresponding to FIG. 8.

The form of design as shown in FIGS. 9 and 10 is of similar construction to the form of design in accordance with FIGS. 7 and 8 and corresponding components have been numbered identically. The intermediate element 295 therein consists only of a single ring to which are coupled the connecting elements for torsional moment transmission between the two coupling halves 260, 272 in both directions of rotation, this ring surrounding coupling half 260 coaxially in the same plane as lugs 264, 266.

The design of shaft coupling shown in FIGS. 11 and 12 incorporates in a construction similar to FIG. 1 only one uniform intermediate element 358 between the two coupling halves 326 and 342. The first coupling half 326 incorporates a boss 328 with three radial projections 330, 332 and 334 at angles of 120° to one another and the second coupling half 342 incorporates a boss 344 with three radial projections 346, 348, 350 at angles of 120° to one another; as illustrated in FIG. 12 one of the projections on each coupling half is masked by the other.

The radial projections 330, 332, 334 of the first coupling half 326 and the radial projections 346, 348, 350 of the second coupling half 342 are provided with pins 336, 338, 340 and 352, 354, 356. In each case diametrically opposed pairs of pins 336, 354; 338, 356 and 340, 352 are connected to one another by means of connecting elements 360, 362, 364 passed through intermediate element 358. Connecting elements 360, 362, 364 consist of steel cables or spring steel wire and are attached to the pins in the same way as the design examples described above.

Intermediate element 358 is a cylindrical body of rubber elastic material along whose surface connecting elements 360, 362, 364 pass in grooves 366 (FIG. 12). It is also possible to provide three 120° angular offset curved support plates 368 on intermediate element 358 which are in each case positioned between the pairs of pins 336, 354; 338, 356; 340, 352 and for the connecting elements 360, 362, 364 to be supported on the surface of intermediate element 358 (FIG. 11). In the design illustrated in FIGS. 11 and 12 the intermediate element 358 has a central longitudinal aperture 370 in which is inserted a longitudinally split sleeve 372 with double conical shaped inner walls 372, 376 tapering towards the center. In sleeve 372 it is possible to insert axially suitably conical shaped thrust members which can be drawn towards the center. Sleeve 372 is then forced apart radially by means of which it is possible to alter the pre-tension of intermediate element 358 and thus the rigidity of the coupling.

FIG. 11 shows three connecting elements 360, 362, 364 which run clockwise offset by 120° to one another from the first coupling half 326 through intermediate element 358 to the second coupling half 342. Further connecting elements of the same type not numbered individually and possessing the same location and attachment run counterclockwise in the same way for transmission of torsional moment between the two coupling halves 326, 342 via intermediate element 358. In each case only the connecting elements subjected to tension provide transmission of torsional moment between the coupling halves 326, 342. The elastic design of intermediate element 358 permits certain angular and radial offset between input axis and output axis and in addition has a vibration damping effect. Additionally, with the presence of sleeve 372, it is possible by axial displacement of the thrust member inserted in it to vary the rigidity of the coupling.

FIGS. 13 and 14 show a modified design of the coupling illustrated in FIGS. 11 and 12 which is similarly constructed and where identical parts are numbered identically. In the case of this modified design the intermediate element 358 consists of an inner tube 378 with an outer covering 380 of rubber elastic material on which the connecting elements for transmission of torsional moment between the two coupling halves 326, 342 in both directions of rotation are located as with the design in accordance with FIG. 12 in grooves 366 on the surface of the intermediate element 358.

With the modified design the lugs whose pins carry the connecting elements only at a relatively considerable distance from the appropriate projection, for example pin 336 on lug 330, are provided with axial projections 382. The projections 382 which are truncated cone-shaped on the outside surround the pins such as pin 336 over a large portion of their length and support them.

With the form of design shown in FIGS. 15 and 16 the intermediate element consists of a star-shaped first part 400 for rotation clockwise as in FIG. 11 and an annular second part 402 positioned in the same plane, surrounding part 400, for rotation counter-clockwise. For the sake of clarity FIG. 15 only shows one pair of connecting elements for each direction of rotation. Further pairs are provided offset in each case by 120° to one another.

In detail the shaft coupling of FIGS. 15 and 16 incorporates a first coupling half 404 with a boss 406 and three lugs 408, 410, 412 projecting radially outwards offset at angles of 120° to one another. On lugs 408, 410, 412 are located axial pins 414, 416, 418. A second coupling half 420 has a boss 422 and three radial lugs 424, 426, 428 offset by 120° to one another and by 60° in relation to lugs 408, 410, 412. On lugs 424, 426, 428 are located axial pins 430, 432 and 434 which extend towards the first coupling half 404 and engage between pins 408, 410, 412.

Symetrical to a central radial plane 436 (FIG. 16) between the two coupling halves 404, 420 are positioned the star-shaped first part 400 and the annular second part 402 of the intermediate element. The star-shaped first part 400 has three 120° offset radial arms 438, 440, 442. The annular second part 402 has three inward projecting lugs 444, 446, 448 at angles of 120° to one another, angularly offset counter-clockwise by 60° in relation to arms 438, 440, 442 of part 400. A connecting element taking the form of a spring steel plate 450 is located on pin 414 and is joined to a pin 452 on arm 438 of part 400. A further spring steel plate 454 extends between pin 452 of part 400 and pin 430 of the second coupling half 420. The spring steel plates 450, 454 thus form a system of connecting elements which extends counter-clockwise about the axis of rotation and becomes effective when the first coupling half 404 is driven clockwise and drives the second coupling half 420. Two further (not illustrated) systems of connecting elements are provided, offset by 20° in each case, between pin 416, a pin 456 on arm 440 of part 400 and pin 432, as well as between pin 418 on arm 442 of part 400 and pin 434.

For the opposite direction of rotation, i.e. when the first coupling half 404 is driven counter-clockwise and drives the second coupling half 420, systems of connecting elements are provided which extend clockwise about the axis of rotation. A first such system consists of a spring steel plate 460 which extends from pin 414 to a pin 462 on lug 448 of annular part 402, andd a spring steel plate 464 which extends from pin 462 to pin 430. Two further similarly constructed (not illustrated) systems of connecting elements are in turn positioned offset by 120° to one another and incorporate spring steel plates between pin 416 and a pin 466 on lug 444 and between pin 466 and pin 432 of the second coupling half 420, as well as between pin 418 and a pin 458 on lug 442 and between pin 458 and pin 434 of the second coupling half 420.

As can be seen from FIG. 15 all pins are located along a common pitch circle 470. In this way very compact arrangement is obtained in axial direction. The variants of the shaft coupling as per FIGS. 15 and 16 shown in FIGS. 25 to 30 also permit radial offset between the shafts to be coupled.

The variant of the shaft coupling illustrated in FIGS. 25 and 26 incorporates a first coupling half 810 with a boss 812 with which coupling half 810 can be fitted in the usual way on to one of the shafts to be coupled with one another. On boss 812 three radial lugs 814, 816, 818 are provided, being at an angle of 120° to one another. A second coupling half 820 incorporates a boss 822 with which coupling half 820 can be fitted on to the other of the two shafts to be coupled to one another. On boss 822 are also provided three radial lugs 824, 826, 828 offset at an angle of 120° to one another and by 60° in relation to the adjacent lugs 814, 816, 818 of the first coupling half 810. As can be seen from FIG. 1, with the coupling in normal position with alignment of the axes, lug 826 of the second coupling half is offset angularly by 60° in relation to lug 814 of the first coupling half 810. Accordingly, lug 824 of the second coupling half 820 is offset by 60° in relation to the lug 818 of the first coupling half 810 and lug 828 of the second coupling half 820 is offset by 60° in relation to lug 816 of the first coupling half. As can also be seen from FIG. 25, lug 824 of the second coupling half 820 is then offset by 180° in relation to lug 814 of the first coupling half 810, lug 826 of the second coupling half 820 by 180° in relation to lug 816 of the first coupling half 810 and lug 828 is offset by 180° in relation to lug 818 of the first coupling half 810.

An inner intermediate element is numbered 830 and an outer intermediate element 832. The inner intermediate element has three lugs 834, 836, 838 projecting radially outwards, offset by 120° to one another and by 30° in a first direction (clockwise from FIG. 25) in relation to lugs 814, 816, 818 of the first coupling half. The outer intermediate element 832 also has three lugs 840, 842, 844 (FIG. 25) projecting radially inwards, offset by 120° to one another and by 30° in the opposite, second direction (counter-clockwise in FIG. 25) in relation to lugs 814, 816, 818 of the first coupling half 810.

Three primary systems of links in the form of two each spring steel plates 846, 848 (FIG. 25) are provided of which in each case a spring steel plate extends from a lug (e.g. 814) of the first coupling half 810 in the primary direction, that is to say clockwise from FIG. 25 around the shafts, to a lug (e.g. 844) of the outer intermediate element 832 and a further spring steel plate 848 extends from this lug 844 in the primary direction to a lug 824 of the second coupling half, being offset by 180° in relation to the appropriate lug 814 of the first coupling half 810. For the sake of clarity FIG. 25 only shows one such system of spring steel plates with spring steel plates 846, 848 by means of which connection is established between lug 814 of the first coupling half and lug 824 of the second coupling half. Corresponding systems with pairs of spring steel plates connect lugs 816, 826 and lugs 818 and 828.

In addition three secondary systems of links are provided in the form of two each spring steel plates 850, and 852 of which in each case a spring steel plate 850 extends from a lug (e.g. 814) of the first coupling half 810 in the secondary direction, that is to say counter-clockwise in FIG. 25 about the shafts, to a lug, e.g. 838 of the inner intermediate element 830 and another one extends from this lug 838 continuing in secondary direction to lug 824 of the second coupling half 820, being offset by 180° in relation to the appropriate lug 814 of the first coupling half. Corresponding systems of in each case two spring steel plates connect lugs 816 and 826 via the inner intermediate element 830, the same applying to lugs 818 and 828. For the sake of clarity these systems have also been omitted in FIG. 25.

As can be seen from FIG. 26, in the case of the shaft coupling in question the lugs 814, 816, 818 and 824, 826, 828 of the two coupling halves 810 and 820 are provided on the axial outer ends of bosses 812 and 822 facing away from one another. Thus in comparison with FIGS. 15 and 16 the coupling halves are so to speak placed reversed on the ends of the shafts to be coupled to one another. The outer and the inner intermediate element 832 and 830 take the form of two elongated tubular components which are positioned coaxially in relation to one another about boss 812 and 822.

The lugs on the outer and the inner intermediate element 832 and 830 each incorporate with this design a lug section, e.g. 834A and 836A, on the one end facing towards the first coupling half 810 and a lug section, e.g. 834B, 836B, on the other end of the appropriate intermediate element 830 and 832 facing towards the second coupling half 820. The spring steel plates connected to the first coupling half are joined to the lug section at one end and the spring steel plates connected to the second coupling half are joined to the lug section at the other end. Thus for example spring steel plates 846 and 850 which are attached to lug 814 of the first coupling half 810 are attached to the lefthand lug sections of lugs 838 and 844 (not visible in FIG. 26). Spring steel plates 848 and 852 which are connected to lug 824 of the second coupling half 820 are attached to the righthand lug sections of lugs 844 and 838 (not visible in FIG. 26 either).

Attachment of the spring steel plates to the lugs is effected by means of pins 854 (see lug 814 in FIG. 26) which are passed through apertures at the ends of the spring steel plates 846, 850 and a hole in lug 814 and are each tightened by means of a nut 856. Between the head of pin 854 and the adjacent spring steel plate 850, between spring steel plates 850 andd 846 and between spring steel plate 846 and the end face of lug 814 spacing washers are inserted in each case.

As the systems of spring steel plates which are connected to the inner and to the outer intermediate element 830 and 832 are positioned in regular arrangement offset by 120° to one another, the radial components of the forces exerted on the intermediate elements are cancelled out so that intermediate elements 830 and 832 are satisfactorily located.

The arrangement described permits angular movement of the intermediate elements 830 and 832 in relation to coupling half 810 for example clockwise, i.e. downwards in FIG. 26. In the same way angular movement between intermediate elements 830 and 832 on the one hand and coupling half 820 on the other hand is possible so that for example coupling half 820 can be swivelled counter-clockwise in relation to intermediate element 830 and 832 by the same angle by which intermediate elements 830 and 832 had been swivelled clockwise in relation to coupling half 810. In consequence of the length of intermediate elements 830 and 832 this corresponds to radial offset of coupling halves 810 and 820 in relation to one another.

Thus the coupling described permits not only angular offset like the coupling in accordance with FIGS. 15 and 16 of the basic patent, but also additionally radial offset. In this case neither the axial nor the radial dimensions of the coupling are greater than in the first instance.

Another form of design as shown in FIGS 27 and 28 is similar in function to the form of design as shown in FIGS. 25 and 26 and corresponding components have been numbered identically.

Whilst in the case of the form of design shown in FIGS. 25 and 26 the lugs 814, 816, 818 and 824, 826, 828 of the two coupling halves 810 and 820 are provided on the axial outer ends of bosses 812, 822 facing away from one another, the lugs 814, 816, 818 and 824, 826, 828 are here located on the ends of bosses 812, and 822 facing towards one another.

The bosses 812 and 822 each incorporate a tubular inner portion 812A and 822A connectable to the shaft and an outer 812B and 822B concentric thereto, also tubular in form, bearing lugs 814, 816, 818 and 824, 826, 828. Between inner portion 812A and 822A and outer portion 812B and 822B is located in each case a cylindrical sleeve 812C and 822C of rubber elastic material. In the case of boss 812 inner and outer portions 812A and 812B are straight tubular sections with essentially cylindrical inner and outer surfaces.

In the ase of boss 822 the inner portion 822A has a double conical outer surface 860 tapering towards the ends. The outer portion 822B is formed in two parts from two tubular halves 822B$_1$ and 822B$_2$ with conical inner surfaces 862 and 864. The two halves have on the ends corresponding to the larger inside diameters radial flanges or tongues 866, 868, 870 which are tightened against one another by bolts 872 and nuts 874.

The cylindrical sleeve 822C of rubber elastic material is formed by two halves 822C$_1$ and 822C$_2$ one of which in each case is held between a tapered section of outer surface 860 of inner portion 822A and one half 822B$_1$ or 822B$_2$ of the outer portion projecting.

It is possible initially for the two halves 822B$_1$ and 822B$_2$ to be kept at a distance from one another, this being determined by the required pre-tension of cylindrical sleeve 822C. Then the two halves 822C$_1$ and 822C$_2$ of cylindrical sleeve 822C are cast and then the halves 822B$_1$ and 822B$_2$ of outer portion 822B are tightened together by means of screws 872 and nuts 874. By this means the required pre-tension of cylindrical sleeve 822C is maintained.

The coupling shown in FIGS. 27 and 28 permit not only an angle of flexure and radial offset between input and output axis. It is also elastic in circumferential direction.

Instead of three systems of spring steel plates offset angularly by 120° to one another it is also possible if necessary to provide only two such systems which are offset at an angle of 180° to one another.

A further variant of the shaft coupling as shown in FIGS. 15 and 16 which is illustrated in FIGS. 29 and 30 incorporates two coupling systems constructed in the manner of FIGS. 15 and 16 mounted in tandem and also additionally permits radial offset between the shafts to be coupled. The shaft coupling incorporates a first coupling half 910 with a boss 912 by means of which coupling half 910 can be fitted on a shaft rotating about an input axis 914, and three radial lugs 916 120° opposed to one another. A second coupling half can be fitted on a second shaft rotating about an output axis 922, and three lugs 924 offset at an angle of 120° to one another. Lugs 916 and 924 of the two coupling halves 910 and 918 are provided on the outer axial ends of bosses 912 and 920 facing away from one another. The two coupling halves are surrounded by a tubular portion 926 which at each of its ends has three lugs offset 120° to one another projecting radially inwards of which in FIG. 30 in each case only one lug 928A and 930A is visible.

The first coupling half 910 is connected by means of a first coupling system 932 to the lefthand end of tubular portion 926 in a manner such as to permit an angle between input axis 914 and the axis of tubular portion 926. The righthand end of tubular portion 926 is in turn connected to the second coupling half 918 by means of an identical coupling system 934.

It is possible therefore for example for the axis of tubular section 926 to swivel clockwise in relation to the horizontal input axis 914. In the same way output axis 922 can be swivelled in relation to the axis of tubular portion 926. With such an arrangement it is possible by virtue of the length of tubular portion 926 for the output axis 922 to be offset radially in relation to the input axis 914. The coupling described thus permits not only an angle of flexure between input axis 914 and output axis 922 but also radial offset between these axes.

Coupling systems 932 and 934 are constructed after the fashion of FIGS. 15 and 16. Below a description is given only of the righthand coupling system 934 visible in FIG. 29. Coupling system 932 is constructed in the same fashion.

Coupling system 934 incorporates an inner intermediate element 934 in the forms of a ring with three 120° offset lugs 938, 940, 942 projecting radially outwards. The lugs 938, 940, 942 are angularly offset by 30° in a primary direction (counter-clockwise in FIG. 29) in relation to lugs 930A, 930B and 930C of an input drive side portion, that is to say of tubular portion 926. In addition there is provided an outer intermediate element 944 surrounding the inner intermedate element 936 with three lugs 946, 948, 950 projecting radially inwards offset by 120° to one another and by 30° in the opposite secondary direction in relation to lugs 930A, 930B, 930C of tubular portion 926. Lugs 930A, 930B, 930C as well as lugs 938, 940, 942 and 946, 948, 950 carry axal pins whose axes are located at angualar intervals of 30° from one another around a common circle 952. Three primary systems of links in the form of two spring steel plates in each case are provded from which in each case a spring steel plate extends from a lug, e.g. 930A of the input drive side portion, that is to say of the tubular portion 926, in the primary direction (counter-clockwise) to a lug, e.g. 948, of the outer intermediate element 944 and another one extends from this lug 948 in this primary direction to a lug 924 of an output drive side portion, that is to say here of the second coupling half 918, which is offset at an angle of 180° in relation to lug 930A of tubular portion 926. These two spring steel plates are numbered 954 and 956 in FIG. 29. The other three systems which are offset at angles of 120° thereto for the sake of clarity only been shown here by broken lines.

These systems of links and spring steel plates transmit a torsional moment clockwise from FIG. 29 when input drive is introduced through the first coupling half 910. In the process spring steel plates 954, 956 are subjected to tension.

For the opposite direction of rotation three further systems of links in the form of two spring steel plates in each case are provided; of these spring steel plates 958 and 960 are shown in FIG. 29. From these further systems there extends in each case a spring steel plate, 958, from a lug 930 of the input drive side portion, that is to say here of tubular portion 926, in secondary direction (clockwise in FIG. 29) to a lug 942 of inner intermediate element 936. A further spring steel plate 960 extends from this lug 942 in secondary direction to lug 924 of the output drive side portion, that is to say here of the second coupling half 918, which is offset at an angle of 180° in relation to the appropriate lug 930 of the input drive side portion. The other two systems of this type are also shown by means of broken lines. Transmission of the torsional moment is effected counter-clockwise by these systems in FIG. 29.

The primary coupling system 932 is designed in corresponding fashion. Whilst for the secondary coupling system the input drive side portion is formed by tubular portion 926 and the output drive side portion by the second coupling half 918, for the primary coupling system 932, the input drive side portion is formed by the first coupling half 910 and the output drive side section by tubular portion 926.

If torsional elasticity of the coupling is required, tubular portion 926 can be divided and the two halves can be connected to one another by connecting elements elastic in circumferential direction.

The design of the shaft coupling as shown in FIGS. 15 and 16 also permits "tandem mounting" of several spring steel plates and intermediate element sections between the first and second coupling half in order to obtain a particularly flexible coupling. Such an arrangement is illustrated diagramatically in FIGS. 17 and 18.

In FIG. 18 the first coupling half is numbered 472 and the second 474. Between the two coupling halves 472 and 474 are positioned three intermediate elements 476, 478, 480 each of which consists of a star-shaped part 482, 484 or 486 in accordance with the nature of part 400 in FIG. 15 and of an annular part 488, 490, 492 surrounding this star-shaped part corresponding to annular part 402 in FIG. 15. In each intermediate element 476, 478, 480 the star-shaped and annular parts occupy the relative positions shown in FIG. 18. The intermediate elements 476, 478 and 480 however are in each case offset at an anlge of 90° to one another seen in their order of arrangement from the input drive side.

For transmission of torsional moment between the coupling halves in a primary direction of rotation a pin 494 of the first coupling half 472 (similar to pin 414 in FIG. 15) is joined by means of a connecting element 496 (similar to spring steel plate 450 in FIG. 15) to a pin 498 (similar to pin 452 in FIG. 15) of star-shaped part 482. From this pin 498 there extends a connecting element 500 similar to spring steel plate 454 in FIG. 15 to a pin 502. This pin 502 however is not located like pin 430 on the second coupling half, but on star-shaped part 484. From pin 502 of star-shaped part 484 a connecting element 504 extends to pin 506 of star-shaped part 486. Pin 506 is in turn connected by a connecting element 508 to a pin 510 of the second coupling half 474 which is in alignment with pin 494 of the first coupling half 472.

For transmission of torsional moment between the coupling halves in the other direction of rotation connecting elements are provided in corresponding fashion which connect the two coupling halves 472, 474 to one another via the outer annular parts 488, 490, 492 of intermediate elements 476, 478, 480.

Instead of a star-shaped inner and an annular outer part, each intermediate element can also incorporate two annular parts.

FIG. 19 illustrates a modified version of the shaft coupling shown in FIGS. 15 and 16. In the diagramatic view of FIG. 19 can be seen on the first coupling half 550 two diametrically opposite lugs 552, 554 with axial pins 556, and 558 which are marked "a", as well as on the second coupling half at an angle of 90° to the first coupling half 550 two diametrically opposed lugs 562, 564 with axial pins 566 and 568 which are marked "b".

The intermediate element consists of an inner part 570 which is marked "$z_1$" and is provided in the shape of a star with four lugs 572, 574, 576, 578 and close to their edges with four pins 573, 575, 577, 579 which are aligned in pairs with lugs "a" and "b". The intermediate element also consists of an outer annular part 580 which is marked "$Z_2$" around whose circumference are distributed pins 582-589 being allocated in pairs to lugs "a" and "b". Two groups of three connecting elements in each case connect the coupling parts to one another in each direction of rotation: connecting elements 590, 591, 592 connect lug 552 of the first coupling half 550 via lug 578 of star-shaped part 570 and via pins 586, 585 of annular part 580 to lugs 564 of the second coupling half 560; correspondingly, connecting elements 594, 595, 596 connect lug 554 of the first coupling half 550 via lug 574 and via pins 582, 589 to lug 562 of the second coupling half 560. These connecting elements 590 to 596 extend counter-clockwise about the coupling axis and therefore provide transmission of torsional moment between the coupling halves when rotated clockwise. It can be seen without further explanation that the connecting elements 600–606 extending in corresponding fashion clockwise about the coupling axis are used for transmission of torsional moment between the coupling halves on rotation counterclockwise. Connecting elements 590–606 can according to requirements consist of spring steel plates or steel cables or lengths of spring steel wire.

The shaft coupling illustrated in FIG. 19 possesses a high degree of flexibility by virtue of the relatively large number of connecting elements arranged behind one another in direction of rotation, whereby however only two pairs of plates are ever available at any one time for transmission of torsional moment in the direction of rotation involved. FIG. 20 illustrates a further modified version of the shaft coupling shown in FIGS. 15 and 16 where it is also possible to transmit high torsional moments.

In the diagrammatic illustration shown in FIG. 20 it is possible to discern four 90° offset axial pins 620, 622, 624, 626 of a first coupling half which are positioned in alignment with corresponding pins of a second coupling half. The intermediate element consists of an inner portion 630 which is provided in a star-shape with four lugs 632, 634, 636 and 638 and close to their edges with four pins 633, 635, 637, 639 which are in alignment with pins 620-626. The intermediate element additionally consists of an outer annular part 640 around whose circumference pins 642-649 are distributed in pairs, being allocated diagonally to pins 620-626.

From each of the pins on the coupling halves there originates a pair of connecting elements 650, 651 and 652, 653. From the input drive side coupling half the connecting elements 650 run from pins 620, 622, 624, 626 to the inner star-shaped part 630 of the intermediate element and from this part the connecting elements 652 pass to pins in alignment with the aforementioned pins on the output drive side coupling half. These connecting elements 650, 652 provide transmission of torsional moment between the coupling halves with clockwise rotation. From the input drive side coupling half the connecting elements 651 pass from pins 620, 622, 624, 626 to the outer annular part 640 of the intermediate element and from this part the connecting elements 653 pass to pins in alignment with the aforementioned pins on the output drive side coupling half. These connecting elements 651, 653 provide transmission of torsional moment between the coupling halves in the case of counterclockwise rotation. All connecting elements can according to requirements consist of spring steel plates, steel cables or lengths of spring steel wire.

FIGS. 21 to 24 show a seventh form of design of the shaft coupling and its modified versions in which an inner intermediate element is provided which is divided axially and whose sections pivot on one another. This form of design fulfills a kinematic function by virtue of its type of design. This kinematic function is made possible by the divided intermediate element by each section of the intermediate element following in swivel fashion the swivel motions of the input drive side or the output drive side.

FIG. 21 shows a simple version of a coupling of this type effective in only one direction of rotation. The first and second coupling halves have diametrically opposed radial lugs with pins 702, 704 and 706, 708 which are marked "a" and "b". Pins 706, 708 of the second coupling half are offset at an angle in relation to pins 702, 704 of the first coupling half in the version illustrated, but can also be positioned in alignment with them. Intermediate element 710 of generally rhomboid cross section is positioned symmetrically in relation to the coupling axis so that the obtuse angled edges point in the direction of pins 702, 706 and 704, 708. It is divided along an axial plane passing through the acute angled edges into two triangular cross section parts 712, 714 whose obtuse angled edges are coupled to one another on both sides by two connecting elements 720 fastened to pins 716, 718.

Other connecting elements connect the first coupling half via sections 712, 714 of intermediate element 710 to the second coupling half. A first pair of connecting elements 722, 728 passes from pins 702 of the first coupling half to a pin 730 on an acute angled edge of the first section 712 an from a pin 736 on the opposite acute angled edge of this section to pin 706 of the second coupling half; a second pair of connecting elements 726, 724 passes correspondingly from pin 704 of the first coupling half via pins 734, 732 on the opposite acute angled edges of the second section 714 to pin 708 of the second coupling half.

In the case of the design illustrated in FIG. 21 the pins 702, 704 marked "a" belong to the input drive side coupling half. Transmission of torsional moment on tensile loading of the connecting elements can only take place clockwise through connecting elements 722, 728 and 726, 724 and sections 712 and 714 of intermediate element 710.

The resistance occurring during transmission of torsional moment between the input drive and output drive side connecting elements is taken up via the two connecting elements 720 by means of the two sections 712, 714 of intermediate element 710. The kinematic function of this arrangement is obtained by virtue of the fact that the connecting elements 720 are of flexible material such as spring steel plates, spring steel wire or steel cables. As a result of this flexibility it is possible for the two sections 712, 714 of intermediate elements 710 to describe swivel motion opposed to one another. As a result of the swivel motion of sections 712, 714 in relation to one another compensation is effected for the changes in distance between the input drive side and output drive side attachment points of the connecting elements.

FIG. 22 shows a modified version of the shaft coupling as per FIG. 21; identical parts in identical arrangement bear identical numbers. In addition this design incorporates a similarly constructed secondary system for transmission of torsional moment between the coupling halves in the same direction of rotation, this being rotated through 90° in relation to the primary system.

The secondary system incorporates diametrically opposite radial lugs with pins 701, 703 which are marked "a" on the input drive side coupling half and diametrically opposite radial lugs with pins 705, 707 marked "b" on the output drive side coupling half. A second intermediate element 711 is accordingly of generally rhomboid cross section with two generally triangular shaped sections 713, 715 whose obtuse angled edges are coupled to one another on both sides by two connecting elements 721 attached to pins 717, 719. Sections 713, 715 of intermediate element 711 are not flat, but are provided with recesses 723, 725 between the opposite acute angled edges, between which are located sections 712, 714 of the first intermediate element 710.

A third pair of connecting elements 727, 733 runs from pin 701 of the input drive side coupling half to a pin 735 on an acute angled edge of the first section 713 of the second intermediate element 711 and from a pin 741 on the opposite acute angled edge of this section to pin 705 of the output drive side coupling half; a fourth pair of connecting elements 731, 729 runs accordingly from pin 703 of the input drive side coupling half via pins 739, 737 on the opposite acute angled edges of section 715 to pin 707 of the output drive side coupling half.

As with the design shown in FIG. 21, transmission of torsional moment is effected here as well between the coupling halves only on rotation of the input drive side coupling half clockwise via connecting elements 722, 728 and 726, 724 in each case via sections 712, 714 of intermediate element 710 and via connecting elements 727, 733 and 731, 729 in each case via sections 713, 715 of intermediate element 711. With unaltered optimum flexibility it is possible with this design to transmit higher torsional moments by virtue of the larger number of connecting elements.

FIGS. 23 and 24 show a further modified design of the shaft coupling which incorporates the same intermediate elements and connecting elements in the same arrangement, but connected such that transmission of torsional moment between the coupling halves can take place in both directions of rotation.

According to the illustration in FIG. 24 a first coupling half 750 is provided with a boss 752 and on the end face with a radial projection 754; a second coupling half 760 is provided with a boss 762 and on the end face with a radial projection 764. In axial holes in projection 754 there are two diametrically opposite pairs of pins 772, 774 and 776, 778 marked "a", of which pin 776 is discernible in FIG. 24; in axial holes in projection 764 there are also two diametrically opposite pairs of pins 782, 784 and 786, 788 marked "b", of which pin 788 is discernible in FIG. 24. The pin arrangement marked "b" is offset at an angle of approximately 30° to the pin arrangement marked "a" in accordance with structural requirements.

Transmission of torsional moment in clockwise direction is effected (FIG. 23) by a primary pair of connecting elements 722, 728 which runs from pin 772 of the first coupling half 750 to pin 730 of the first section and from pin 736 of this section to pin 788 of the second coupling half 760, and a second pair of connecting elements 726, 724 which runs from pin 776 of the first coupling half 750 to pin 734 of the second section and from pin 732 of this section to pin 784 of the second coupling half 760. Transmission of torsional moment counter-clockwise is effected by a third pair of connecting elements 729, 731 which runs from pin 774 of the first coupling half 750 to pin 737 of the second section 715 and from pin 739 of this section to pin 782 of the second coupling half 760, and a fourth pair of connecting elements 733, 727 which runs from pin 778 of the first coupling half 750 to pin 741 of the first section 713 and from pin 735 of this section to pin 786 of the second coupling half 760.

As in some of the designs of shaft coupling described previously (e.g. FIG. 4), here as well the connecting elements are pushed on to the shanks of the appropriate pins with spacer sleeves or collars which are not illustrated or described in detail. The pins extend through corresponding holes in the coupling portions involved and are provided with threads on to which a nut is screwed in each case. When the nuts are tightened the connecting elements and the spacer sleeves or collars are tightened against the surface of the coupling section concerned. The connecting elements themselves can as before consist of spring steel plates, but in the case of the design of shaft coupling shown in FIGS. 21-24 are preferably formed from round material such as steel cables, lengths of spring steel wire etc. which possess greater degrees of freedom of movement than spring steel plates. In addition the connecting elements can take the form of links with spherical rubber cups on the pins.

It is also quite possible to divide the intermediate element not just once along its axial plane but also several times and to provide a corresponding number of connecting elements and projections on the coupling halves whereby the arrangement can in each case be such that transmission of torsional moment between the coupling halves is effected in only one direction of rotation or in both directions of rotation. Consequently the sections of the intermediate element are all located in one plane, this resulting in optimum, compact construction of the shaft coupling without any reduction in its high degree of flexibility.

What is claimed is:

1. Shaft coupling drivingly interconnecting an input member rotatable about an input axis and an output member rotatable about an output axis and permitting an angle of flexure between the input axis and the output axis, said coupling defining a circumferential direction and comprising:

a first coupling half connectable to said input member and defining three connecting points angularly spaced by 120°;

a second coupling half connectable to said output member and defining three connecting points angularly spaced by 120°;

a star-shaped first intermediate element part having three radially outwardly extending arms angularly spaced by 120°, said first intermediate element part being disposed between said first and second coupling halves;

a first coupling set including three elongated, flexible connecting elements connected to said first coupling half at one of said connecting points each, extending in a first circumferential direction therefrom and connected to said first intermediate element part at one of said arms each, and further including three elongated, flexible connecting elements connected to said first intermediate element part at one of said arms each extending in said first circumferential direction therefrom and connected to said second coupling half at a respective one of said three connecting points thereof;

an annular second intermediate element part having three radially inwardly extending lugs angularly spaced by 120°, said second intermediate element part being disposed between said first and second coupling halves surrounding said first intermediate element part; and a second coupling set including three elongated flexible connecting elements connected to said first coupling half at one of said connecting points each, extending therefrom in a second circumferential direction opposite to said first circumferential direction and connected to said second intermediate element part at one of said lugs each, and further including three elongated, flexible connecting elements connected to said second intermediate element part at one of said lugs each, extending in said second circumferential direction therefrom and connected to said second coupling half at a respective one of said three connecting points thereof.

* * * * *